(12) United States Patent
Ozzie et al.

(10) Patent No.: US 9,203,786 B2
(45) Date of Patent: Dec. 1, 2015

(54) DATA SYNCHRONIZATION AND SHARING RELATIONSHIPS

(71) Applicant: Microsoft Corporation, Redmond, WA (US)

(72) Inventors: Raymond E. Ozzie, Seattle, WA (US); Jack E. Ozzie, North Bend, WA (US); George P. Moromisato, Seattle, WA (US); Paresh S. Suthar, Redmond, WA (US); Raman Narayanan, Kirkland, WA (US); Matthew S. Augustine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/740,506

(22) Filed: Jan. 14, 2013

(65) Prior Publication Data

US 2013/0132493 A1 May 23, 2013

Related U.S. Application Data

(63) Continuation of application No. 11/532,390, filed on Sep. 15, 2006, now Pat. No. 8,370,423.

(60) Provisional application No. 60/805,056, filed on Jun. 16, 2006.

(51) Int. Cl.
| | | |
|---|---|---|
| *G06F 15/16* | (2006.01) | |
| *G06F 17/00* | (2006.01) | |
| *H04L 12/58* | (2006.01) | |
| *G06F 17/30* | (2006.01) | |
| *H04L 29/08* | (2006.01) | |

(52) U.S. Cl.
CPC .......... *H04L 51/04* (2013.01); *G06F 17/30578* (2013.01); *H04L 67/1095* (2013.01); *H04L 67/26* (2013.01)

(58) Field of Classification Search
USPC ................ 709/201–204, 230–244; 707/1–10
See application file for complete search history.

(56) References Cited

U.S. PATENT DOCUMENTS

| | | |
|---|---|---|
| 5,261,080 A | 11/1993 | Khoyi et al. |
| 5,388,211 A | 2/1995 | Hornbuckle |
| 5,392,386 A | 2/1995 | Chalas et al. |

(Continued)

FOREIGN PATENT DOCUMENTS

| | | |
|---|---|---|
| EP | 0597575 B1 | 12/1999 |
| GB | 2354851 A | 4/2001 |

(Continued)

OTHER PUBLICATIONS

Final office action cited in related U.S. Appl. No. 11/532,390 dated: Jul. 22, 2010 pp. 25.
Amendment cited in related U.S. Appl. No. 11/532,390 dated: Apr. 26, 2010 pp. 17.
Non Final office action cited in related U.S. Appl. No. 11/532,390 dated: Jan. 26, 2010 pp. 18.
Final office action cited in related U.S. Appl. No. 11/532,390 dated: Sep. 23, 2009 pp. 25.

(Continued)

*Primary Examiner* — Afshawn Towfighi
(74) *Attorney, Agent, or Firm* — Dan Choi; Judy Yee; Micky Minhas

(57) ABSTRACT

Systems and methods for synchronizing and sharing data associated with sharing relationships are disclosed. Such systems and methods may be implemented by interfacing with an application that manages or accesses the data to be shared, and by making shared data available using a feed along with some mechanism for tracking changes or enabling synchronization between different endpoints.

20 Claims, 12 Drawing Sheets

(56) References Cited

U.S. PATENT DOCUMENTS

| | | |
|---|---|---|
| 5,442,742 A | 8/1995 | Greyson et al. |
| 5,579,521 A | 11/1996 | Shearer et al. |
| 5,625,809 A | 4/1997 | Dysart et al. |
| 5,706,452 A | 1/1998 | Ivanov |
| 5,752,254 A | 5/1998 | Sakairi et al. |
| 5,781,192 A | 7/1998 | Kodimer |
| 5,781,908 A | 7/1998 | Williams et al. |
| 5,899,996 A | 5/1999 | Dysart et al. |
| 5,924,099 A | 7/1999 | Guzak et al. |
| 5,926,633 A | 7/1999 | Takagi et al. |
| 5,964,834 A | 10/1999 | Crutcher et al. |
| 5,974,238 A | 10/1999 | Chase, Jr. et al. |
| 5,999,938 A | 12/1999 | Bliss et al. |
| 6,091,731 A | 7/2000 | Biegaj et al. |
| 6,177,939 B1 | 1/2001 | Blish et al. |
| 6,199,079 B1 | 3/2001 | Gupta et al. |
| 6,202,100 B1 | 3/2001 | Maltby et al. |
| 6,295,541 B1 | 9/2001 | Bodnar et al. |
| 6,309,305 B1 | 10/2001 | Kraft |
| 6,338,084 B1 | 1/2002 | Rankin et al. |
| 6,400,996 B1 | 6/2002 | Hoffberg et al. |
| 6,401,104 B1 | 6/2002 | LaRue et al. |
| 6,460,089 B1 | 10/2002 | Romano et al. |
| 6,490,634 B2 | 12/2002 | Coiner et al. |
| 6,499,042 B1 | 12/2002 | Markus |
| 6,532,474 B2 | 3/2003 | Iwamoto et al. |
| 6,549,922 B1 | 4/2003 | Srivastava et al. |
| 6,553,037 B1 | 4/2003 | Pivowar et al. |
| 6,591,295 B1 | 7/2003 | Diamond et al. |
| 6,594,246 B1 | 7/2003 | Jorgensen |
| 6,662,340 B2 | 12/2003 | Rawat et al. |
| 6,675,213 B1 | 1/2004 | Schmonsees et al. |
| 6,697,839 B2 | 2/2004 | Sini et al. |
| 6,721,951 B1 | 4/2004 | Williams et al. |
| 6,724,403 B1 | 4/2004 | Santoro et al. |
| 6,760,728 B1 | 7/2004 | Osborn et al. |
| 6,781,192 B2 | 8/2004 | Farrar |
| 6,829,606 B2 | 12/2004 | Ripley |
| 6,910,179 B1 | 6/2005 | Pennell et al. |
| 6,912,690 B2 | 6/2005 | Bauchot et al. |
| 6,954,930 B2 | 10/2005 | Drake et al. |
| 6,983,328 B2 | 1/2006 | Beged-Dov et al. |
| 6,986,105 B2 | 1/2006 | Walker, Jr. et al. |
| 6,993,522 B2 | 1/2006 | Chen et al. |
| 7,003,546 B1 | 2/2006 | Cheah et al. |
| 7,007,041 B2 | 2/2006 | Multer et al. |
| 7,013,316 B1 | 3/2006 | Hansen et al. |
| 7,031,956 B1 | 4/2006 | Lee et al. |
| 7,117,494 B2 | 10/2006 | Rajaram |
| 7,124,204 B2 | 10/2006 | Givoly et al. |
| 7,130,924 B2 | 10/2006 | Bartlett et al. |
| 7,146,571 B2 | 12/2006 | Bates et al. |
| 7,207,008 B1 | 4/2007 | Koch |
| 7,234,000 B2 | 6/2007 | McEachern et al. |
| 7,248,978 B2 | 7/2007 | Ransom |
| 7,260,610 B2 | 8/2007 | Grooters et al. |
| 7,293,112 B2 | 11/2007 | Cone et al. |
| 7,296,266 B2 | 11/2007 | Curtis |
| 7,395,317 B2 | 7/2008 | Naick et al. |
| 7,421,155 B2 | 9/2008 | King et al. |
| 7,451,224 B1 | 11/2008 | Stamler |
| 7,475,390 B2 | 1/2009 | Berstis et al. |
| 7,480,861 B2 | 1/2009 | Yalovsky et al. |
| 7,487,191 B2 | 2/2009 | Castro et al. |
| 7,496,230 B2 | 2/2009 | Chen et al. |
| 7,640,184 B1 | 12/2009 | Lunt |
| 7,653,903 B2 | 1/2010 | Purkeypile et al. |
| 7,698,453 B2 | 4/2010 | Samuels et al. |
| 7,702,816 B2 | 4/2010 | Narayanan et al. |
| 7,711,835 B2 | 5/2010 | Braddy et al. |
| 7,725,456 B2 | 5/2010 | Augustine |
| 7,729,363 B2 | 6/2010 | Shenfield et al. |
| 7,730,482 B2 | 6/2010 | Illowsky et al. |
| 7,730,484 B2 | 6/2010 | von Tetzchner |
| 7,739,402 B2 | 6/2010 | Roese et al. |
| 7,743,373 B2 | 6/2010 | Avram et al. |
| 7,774,753 B1 | 8/2010 | Reilly et al. |
| 7,802,015 B2 | 9/2010 | Cheifot et al. |
| 7,933,296 B2 | 4/2011 | Augustine et al. |
| 7,950,066 B1 | 5/2011 | Zulli |
| 8,001,081 B1 * | 8/2011 | Mills et al. .................. 707/624 |
| 8,020,112 B2 | 9/2011 | Ozzie et al. |
| 8,069,226 B2 | 11/2011 | Momchilov et al. |
| 8,296,671 B2 | 10/2012 | Narayanan |
| 8,429,551 B2 | 4/2013 | Kim et al. |
| 2002/0007375 A1 | 1/2002 | Ebata |
| 2002/0007380 A1 | 1/2002 | Bauchot et al. |
| 2002/0073204 A1 | 6/2002 | Dutta et al. |
| 2002/0122054 A1 | 9/2002 | Hind et al. |
| 2002/0133508 A1 | 9/2002 | LaRue et al. |
| 2002/0138653 A1 | 9/2002 | Ogura et al. |
| 2002/0143997 A1 | 10/2002 | Huang et al. |
| 2003/0009602 A1 | 1/2003 | Jacobs et al. |
| 2003/0105831 A1 | 6/2003 | O'Kane et al. |
| 2003/0115301 A1 | 6/2003 | Koskimies et al. |
| 2003/0142134 A1 | 7/2003 | Bates et al. |
| 2003/0149708 A1 | 8/2003 | Tsao et al. |
| 2003/0220966 A1 | 11/2003 | Hepper et al. |
| 2004/0019614 A1 | 1/2004 | Wang |
| 2004/0070607 A1 | 4/2004 | Yalovsky et al. |
| 2004/0070622 A1 | 4/2004 | Cossey et al. |
| 2004/0100496 A1 | 5/2004 | Creasor |
| 2004/0103167 A1 | 5/2004 | Grooters |
| 2004/0122809 A1 | 6/2004 | Clark |
| 2004/0148375 A1 | 7/2004 | Levett |
| 2004/0153974 A1 | 8/2004 | Walker et al. |
| 2004/0172423 A1 | 9/2004 | Kaasten et al. |
| 2004/0172584 A1 | 9/2004 | Jones et al. |
| 2004/0205470 A1 | 10/2004 | Jones et al. |
| 2004/0210845 A1 | 10/2004 | Paul |
| 2004/0210846 A1 | 10/2004 | Olsen et al. |
| 2004/0226012 A1 | 11/2004 | Awada et al. |
| 2004/0250215 A1 | 12/2004 | Chen |
| 2005/0034060 A1 | 2/2005 | Kotler et al. |
| 2005/0038811 A1 | 2/2005 | Pivowar et al. |
| 2005/0050054 A1 | 3/2005 | Clark et al. |
| 2005/0066335 A1 | 3/2005 | Aarts et al. |
| 2005/0086384 A1 | 4/2005 | Ernst |
| 2005/0091603 A1 | 4/2005 | Chen et al. |
| 2005/0093868 A1 | 5/2005 | Hinckley |
| 2005/0102629 A1 | 5/2005 | Chen et al. |
| 2005/0117606 A1 | 6/2005 | Kim et al. |
| 2005/0125377 A1 | 6/2005 | Kotler et al. |
| 2005/0138122 A1 | 6/2005 | Boehringer et al. |
| 2005/0138554 A1 | 6/2005 | Bell et al. |
| 2005/0154994 A1 | 7/2005 | Chen et al. |
| 2005/0155017 A1 | 7/2005 | Berstis et al. |
| 2005/0165615 A1 | 7/2005 | Minar et al. |
| 2005/0172241 A1 | 8/2005 | Daniels et al. |
| 2005/0172296 A1 | 8/2005 | Schleifer et al. |
| 2005/0182792 A1 | 8/2005 | Israel et al. |
| 2005/0198299 A1 | 9/2005 | Beck et al. |
| 2005/0203905 A1 | 9/2005 | Jung et al. |
| 2005/0203935 A1 | 9/2005 | McArdle et al. |
| 2005/0256907 A1 | 11/2005 | Novik et al. |
| 2005/0262521 A1 | 11/2005 | Kesavarapu |
| 2005/0289265 A1 | 12/2005 | Illowsky |
| 2006/0004600 A1 | 1/2006 | Summer et al. |
| 2006/0010204 A1 | 1/2006 | Jalava |
| 2006/0012301 A1 | 1/2006 | Yang |
| 2006/0026551 A1 | 2/2006 | Shrowty |
| 2006/0028396 A1 | 2/2006 | Starbuck et al. |
| 2006/0031757 A9 | 2/2006 | Vincent |
| 2006/0041589 A1 | 2/2006 | Helfman et al. |
| 2006/0041893 A1 | 2/2006 | Castro et al. |
| 2006/0059247 A1 | 3/2006 | Marappan et al. |
| 2006/0066335 A1 | 3/2006 | Kang et al. |
| 2006/0074996 A1 | 4/2006 | Corbett et al. |
| 2006/0095507 A1 | 5/2006 | Watson et al. |
| 2006/0106879 A1 | 5/2006 | Zondervan et al. |
| 2006/0123010 A1 | 6/2006 | Landry et al. |
| 2006/0129907 A1 | 6/2006 | Volk et al. |
| 2006/0129917 A1 | 6/2006 | Volk et al. |
| 2006/0143459 A1 | 6/2006 | Villaron et al. |

(56) References Cited

U.S. PATENT DOCUMENTS

| | | | |
|---|---|---|---|
| 2006/0150004 A1 | 7/2006 | Mizutani et al. | |
| 2006/0155821 A1 | 7/2006 | Pichetti et al. | |
| 2006/0173985 A1 | 8/2006 | Moore et al. | |
| 2006/0184617 A1 | 8/2006 | Nicholas et al. | |
| 2006/0190835 A1 | 8/2006 | Cunningham et al. | |
| 2006/0206807 A1 | 9/2006 | Rosner et al. | |
| 2006/0212792 A1 | 9/2006 | White et al. | |
| 2006/0212905 A1 | 9/2006 | Matsuda et al. | |
| 2006/0215215 A1 | 9/2006 | Kumaran et al. | |
| 2006/0217126 A1 | 9/2006 | Sohm et al. | |
| 2006/0218224 A1 | 9/2006 | Agrawal et al. | |
| 2006/0218492 A1 | 9/2006 | Andrade et al. | |
| 2006/0224775 A1* | 10/2006 | Lee et al. | 709/248 |
| 2006/0225137 A1 | 10/2006 | Odins-Lucas et al. | |
| 2006/0230021 A1 | 10/2006 | Diab et al. | |
| 2006/0230345 A1 | 10/2006 | Weng et al. | |
| 2006/0242327 A1 | 10/2006 | Knight et al. | |
| 2006/0242549 A1 | 10/2006 | Schwier et al. | |
| 2006/0247961 A1* | 11/2006 | Klemow | 705/8 |
| 2006/0253489 A1 | 11/2006 | Kahn et al. | |
| 2006/0265395 A1 | 11/2006 | Raman | |
| 2006/0265396 A1 | 11/2006 | Raman et al. | |
| 2006/0265409 A1 | 11/2006 | Neumann et al. | |
| 2006/0265518 A1 | 11/2006 | Owens et al. | |
| 2006/0282822 A1 | 12/2006 | Weng et al. | |
| 2006/0288053 A1 | 12/2006 | Holt et al. | |
| 2006/0288329 A1 | 12/2006 | Gandi et al. | |
| 2007/0022174 A1 | 1/2007 | Issa et al. | |
| 2007/0038712 A1 | 2/2007 | Affronti et al. | |
| 2007/0061752 A1 | 3/2007 | Cory | |
| 2007/0078904 A1 | 4/2007 | Yoon et al. | |
| 2007/0100959 A1 | 5/2007 | Eichstaedt et al. | |
| 2007/0100960 A1 | 5/2007 | Eichstaedt et al. | |
| 2007/0106952 A1 | 5/2007 | Matas et al. | |
| 2007/0112880 A1 | 5/2007 | Yang et al. | |
| 2007/0136443 A1 | 6/2007 | Sah et al. | |
| 2007/0162517 A1 | 7/2007 | Teegan | |
| 2007/0168461 A1 | 7/2007 | Moore | |
| 2007/0179989 A1 | 8/2007 | Maes | |
| 2007/0198633 A1 | 8/2007 | Thibeault | |
| 2007/0204308 A1 | 8/2007 | Nicholas | |
| 2007/0226713 A1 | 9/2007 | McGowan et al. | |
| 2007/0250520 A1 | 10/2007 | Dottinger et al. | |
| 2007/0276836 A1 | 11/2007 | Chatterjee et al. | |
| 2007/0294366 A1 | 12/2007 | Ozzie et al. | |
| 2007/0299880 A1 | 12/2007 | Kawabe et al. | |
| 2008/0005081 A1 | 1/2008 | Green | |
| 2008/0028442 A1 | 1/2008 | Kaza et al. | |
| 2008/0046471 A1 | 2/2008 | Moore et al. | |
| 2008/0108744 A1 | 5/2008 | Ishigi et al. | |
| 2008/0109464 A1 | 5/2008 | Ozzie et al. | |
| 2008/0109744 A1 | 5/2008 | Ozzie et al. | |
| 2008/0109832 A1 | 5/2008 | Ozzie et al. | |
| 2008/0115046 A1 | 5/2008 | Yamaguchi | |
| 2008/0126364 A1 | 5/2008 | Khosravy et al. | |
| 2008/0134016 A1 | 6/2008 | Niemoller et al. | |
| 2008/0141136 A1 | 6/2008 | Ozzie et al. | |
| 2008/0144669 A1 | 6/2008 | Lee et al. | |
| 2008/0155112 A1 | 6/2008 | Ma et al. | |
| 2008/0195739 A1 | 8/2008 | Ozzie et al. | |
| 2008/0243874 A1 | 10/2008 | Suthar et al. | |
| 2008/0267221 A1 | 10/2008 | Ozzie et al. | |
| 2008/0270481 A1 | 10/2008 | Augustine | |
| 2008/0313219 A1 | 12/2008 | Benfield et al. | |
| 2011/0106795 A1 | 5/2011 | Maim | |
| 2011/0119403 A1 | 5/2011 | Ozzie et al. | |
| 2011/0126093 A1 | 5/2011 | Ozzie et al. | |
| 2013/0014044 A1 | 1/2013 | Narayanan et al. | |
| 2013/0262972 A1 | 10/2013 | Ozzie et al. | |

FOREIGN PATENT DOCUMENTS

| | | |
|---|---|---|
| JP | 2002278681 | 9/2002 |
| JP | 2004133943 | 4/2004 |
| JP | 2005031979 | 3/2005 |
| JP | 2006262034 | 9/2006 |
| KR | 1020050049760 | 5/2005 |
| WO | 0073902 A1 | 12/2000 |
| WO | 0217162 A2 | 2/2002 |
| WO | 03030475 A2 | 4/2003 |

OTHER PUBLICATIONS

Amendment cited in related U.S. Appl. No. 11/532,390 dated: Jun. 11, 2009 pp. 21.
Non Final office action cited in related U.S. Appl. No. 11/532,390 dated: Mar. 13, 2009 pp. 82.
Wittenbrink, Heinz.; "RSS and Atom, Understanding and Implementing Content Feeds and Syndication". http://research.microsoft.com/pubs/69160/maze.pdf Published Date: Nov. 8, 2005 pp. 1-37.
Ozzie, Jack, et al.; "Simple Sharing Extensions for Atom and RSS"., http://msdn.microsoft.com/ja-jp/library/bb510102(en-us).aspx Dated: May 7, 2007 pp. 15.
Final office action cited in related U.S. Appl. No. 11/674,046 dated: Oct. 21, 2011 pp. 35.
Amendment cited in related U.S. Appl. No. 11/674,046 dated: Jul. 28, 2011 pp. 17.
Non Final office action cited in related U.S. Appl. No. 11/674,046 dated: Apr. 29, 2011 pp. 32.
Amendment cited in related U.S. Appl. No. 11/674,046 dated: Jul. 15, 2010 pp. 20.
Final office action cited in related U.S. Appl. No. 11/674,046 dated: Oct. 28, 2010 pp. 31.
Non Final office action cited in related U.S. Appl. No. 11/674,046 dated: Apr. 16, 2010 pp. 43.
Amendment cited in related U.S. Appl. No. 11/674,046 dated: Jan. 18, 2011 pp. 21.
Non Final office action cited in related U.S. Appl. No. 11/670,054 dated: Dec. 31, 2010 pp. 52.
Amendment cited in related U.S. Appl. No. 11/670,054 dated: Jul. 2, 2012 pp. 32.
Final office action cited in related U.S. Appl. No. 11/670,054 dated: Mar. 16, 2012 pp. 43.
Amendment cited in related U.S. Appl. No. 11/670,054 dated: Dec. 29, 2011 pp. 19.
Non Final office action cited in related U.S. Appl. No. 11/670,054 dated: Oct. 19, 2011 pp. 46.
Amendment cited in related U.S. Appl. No. 11/670,054 dated: Jun. 30, 2010 pp. 23.
Final office action cited in related U.S. Appl. No. 11/670,054 dated: Mar. 8, 2010 pp. 36.
Non Final office action cited in related U.S. Appl. No. 11/670,054 dated: Jul. 24, 2009 pp. 28.
Amendment cited in related U.S. Appl. No. 11/670,054 dated: Nov. 19, 2009 pp. 20.
Non Final office action cited in related U.S. Appl. No. 11/681,321 dated: Jan. 27, 2009 pp. 27.
Amendment cited in related U.S. Appl. No. 11/681,321 dated: Apr. 27, 2009 pp. 17.
Final office action cited in related U.S. Appl. No. 11/681,321 dated: Jul. 13, 2009 pp. 21.
Amendment cited in related U.S. Appl. No. 11/681,321 dated: Oct. 19, 2009 pp. 18.
Amendment cited in related U.S. Appl. No. 11/681,321 dated: Dec. 2, 2009 pp. 4.
Amendment cited in related U.S. Appl. No. 11/681,321 dated: Dec. 15, 2009 pp. 2.
Non Final office action cited in related U.S. Appl. No. 11/681,321 dated: Apr. 23, 2010 pp. 37.
Amendment cited in related U.S. Appl. No. 11/681,321 dated: Jul. 23, 2010 pp. 15.
Notice of Allowance cited in related U.S. Appl. No. 11/681,321 dated: Sep. 1, 2010 pp. 26.
Notice of Allowance cited in related U.S. Appl. No. 11/681,321 dated: Oct. 28, 2010 pp. 11.
Amendment cited in related U.S. Appl. No. 11/681,321 dated: Jan. 18, 2010 pp. 10.

(56) References Cited

OTHER PUBLICATIONS

Notice of Allowance cited in related U.S. Appl. No. 11/681,321 dated: Jan. 13, 2011 pp. 34.
Notice of Allowance cited in related U.S. Appl. No. 11/681,321 dated: Mar. 7, 2011 pp. 13.
Amendment after notice of allowance cited in related U.S. Appl. No. 11/681,321 dated: Dec. 17, 2012 pp. 15.
Notice of Allowance cited in related U.S. Appl. No. 11/681,321 dated: Sep. 17, 2012 pp. 53.
Amendment cited in related U.S. Appl. No. 11/681,321 dated: Mar. 13, 2012 pp. 12.
Notice of Allowance cited in related U.S. Appl. No. 11/681,321 dated: Dec. 13, 2011 pp. 34.
Amendment cited in related U.S. Appl. No. 11/681,321 dated: Sep. 26, 2011 pp. 16.
Non Final office action cited in related U.S. Appl. No. 11/681,321 dated: Jun. 24, 2011 pp. 35.
Amendment cited in related U.S. Appl. No. 11/681,321 dated: Sep. 22, 2010 pp. 25.
Final office action cited in related U.S. Appl. No. 11/681,321 dated: Jul. 22, 2010 pp. 25.
Amendment cited in related U.S. Appl. No. 11/681,321 dated: Apr. 26, 2010 pp. 17.
Non Final office action cited in related U.S. Appl. No. 11/681,321 dated: Jan. 26, 2010 pp. 18.
Final office action cited in related U.S. Appl. No. 11/681,321 dated: Sep. 23, 2009 pp. 25.
Amendment cited in related U.S. Appl. No. 11/681,321 dated: Jun. 11, 2009 pp. 21.
Non Final office action cited in related U.S. Appl. No. 11/681,321 dated: Mar. 13, 2009 pp. 66.
Amendment cited in related U.S. Appl. No. 11/532,390 dated: Jan. 2, 2013 pp. 4.
Amendment after notice of allowance cited in related U.S. Appl. No. 11/532,390 dated: Dec. 17, 2012 pp. 15.
Notice of allowance cited in related U.S. Appl. No. 11/532,390 dated: Sep. 17, 2012 pp. 53.
Amendment cited in related U.S. Appl. No. 11/532,390 dated: Mar. 13, 2012 pp. 12.
Notice of allowance cited in related U.S. Appl. No. 11/532,390 dated: Dec. 13, 2012 pp. 34.
Amendment cited in related U.S. Appl. No. 11/532,390 dated: Sep. 26, 2011 pp. 16.
Non Final office action cited in related U.S. Appl. No. 11/532,390 dated: Jun. 24, 2011 pp. 35.
Amendment cited in related U.S. Appl. No. 11/532,390 dated: Sep. 22, 2010 pp. 25.
Antoniu, Gabriel; "JUXMEM: An Adaptive Supportive Platform for Data Sharing on the Grid"; No. 4917 INRIA in Proceedings Workshop on Adaptive Grid Middleware (AGRIDM 2003) http://hal.inria.fr/docs/00/05/41/89/PDF/AntBouJan-AGRIDM2003.pdf Date: 2003 pp. 11.
Aperley, Mark, et al; "Breaking the Cop/Paste Cycle: The Stretchable Selection Tool". In Proceedings of AUIC '00 The First Annual Australasian User Interface Conference; 2000 Hamilton, New Zealand. http://www.computer.org/csdl/proceedings/auic/2000/0515/00/05150003-abs.html Date: Jan. 31-Feb. 3, 2000 pp. 8.
Atom Enabled: "What is Atom?"; http://atomenabled.org Dated: Apr. 5, 2007 pp. 1-2.
"Attensa Feed Server-Secure, Scalable Web Feed Server"; http://www.attensa.com/products/server last entered on Dec. 14, 2006.
Ozzie, Ray; "Blog: Wiring the Web" http://rayozzie.spaces.live.com/blog/cns!FB3017FBB9B2E142!285.entry Mar. 7, 2006 pp. 1-5.
Burcham, Bill; "Baby Steps to Synergistic Web App"; http://lesscode.org/2005/10/21/baby-steps-to-synergistic-web-apps/ Published Date: Oct. 21, 2005 pp. 1-11.
Burcham, Bill; "Half a Baby Step", http://lesscode.org/2005/11/02/half-a-baby-step http://lesscode.org/2005/11/02/half-a-baby-step Published Date: Nov. 2, 2005. pp. 1-5.
Burcham, Bill; "Ray Ozzie Demos Web App Clipboard" http://www.memerocket.com/2006/03/21/ray-ozzie-demos-web-app-clipboard Published Date: Mar. 21, 2006. pp. 1-6.
Burcham, Bill; "Ray Ozzie Got the Memo" http://lesscode.org/2006/03/22/ray-ozzie-got-the-memo Published Date: Mar. 22, 2006 pp. 1-4.
Cheung, Wai-Leung; et al.; "Automatic Device Configuration and Validation through Mobile Communication". IEEE 2003. http://IEEexplore.ieee.org/iel5/8743/27700/01235773.pdf?isNumber=In Proceedings of 2003 IEEE Pacific Rim Conference on Communications, Computers and signal Processing. Published Date: Aug. 28-30, 2003 pp. 284-287 vol. 1.
Chmielewski, David; "A Distributed Platform for Archiving and Retrieving RSS Feeds", In Proceedings of the Fourth Annual ACIS International Conference on Computer and Information Science (ICIS 2005); Copyright 2005 IEEE http://ieeexplore.ieee.org/iel5/10154/32462/01515404.pdf?isNumber=Published Date: 2005 pp. 215-220.
Chudnov, Daniel, et al,; "Introducing unAPI", Published in: Ariadne, Issue 48. http://www.ariadne.ac.uk/issue48/chudnov-et-al Dated: Jul. 29, 2006. pp. 1-15.
MSDN Clipboard 2006; http://msdn.microsoft.com/library/default.asp?url=/library/en-us/winui/windowsuserinterface/dataexchange/clipboard.asp.
CodeGuru "Clipboard copy/paste detection" http://www.codeguru.com/forum/showthread.php?t=343977 Posts Dated: 2005-2007 pp. 1-17.
"Copy Structured Data between Web Sites through RSS: Ray's Live Clipboard is Next" http://www.masternewmedia.org/news/2006/03/31/copy_structured_data_between_web.htm Published: Mar. 31, 2006 pp. 7.
"Ektron CMS2000", http://www.ektron.com/manuals/datasheets/EktronCMS200-datasheet.pdf Published Date: Dec. 14, 2006 pp. 3.
Attensa: Enterprise RSS the Center of Attention. http;//attensa.typepad.com/attensa/files/attensa_enterprise_rss_whitepaper_0605.pdf Published Date: May 2006 pp. 1-11.
eZINE Approach; Understanding OLE http://www.glencoe.com/ps/computered/pas/article.php4?articleId=149 Published Date: 2001.
Front Page Atom Wiki: "The Atom Project". http://intertwingly.net/wiki/pie/FrontPage Dated: Nov. 14, 2007.
Google Data API's (Beta) Developers Guide: Google Data API's Overview. https://developers.google.com/gdata/docs/developers-guide Retrieved Date: Apr. 5, 2007 p. 1.
Gregorio J. et al.; "The Atom Publishing Protocol" Copyright the IETF Trust 2007. http://bitworking.org/projects/atom/draft-ietf-atompub-protocol-10.html Dated: Mar. 4, 2007.
Hansen, Frank Allen; "RSS as a Distribution Medium for geo-spatial hypermedia" HT'05 http://www.daimi.au.dk/~bentor/papers/hansen-ht05.pdf Dated: Sep. 6-9, 2005 Salzburg, Austria. pp. 1-3.
Hinchcliffe, Dion; "How Simple Sharing Extensions Will Change the Web" Dion Hinchcliffes Web 2.0 blog. SOAWebService Journal. http://web2wsj2.com/how_simple_sharing_extensions_will_change_the_web.htm Dated: Nov. 26, 2005 pp. 10.
Goodman, Danny, et al.; "Javascript Bible" Published by John Wiley & Sons. http://media.wiley.com/product_ancillary/28/07645334/DOWNLOAD/all.pdf Published Date: Apr. 8, 2007 pp. 1-15.
Kawell, Leonard Jr., et al.; "Replicated Document Management in a Group Communication System", Presented at Second Annual Conference on Computer Supported Cooperative Work, 1988 http://dl.acm.org/citation.cfm?id=1024798&dl=ACM&coll=DL&CFID=175613427&CFTOKEN=69916774 Published Date: Sep. 26-28, 1988 pp. 1-11.
Marchal, Benoit; "Working XML: Expand RSS capabilities with RSS extensions" http://www.ibm.com/developerworks/xml/library/x-wxxm36/index.html Dated: Aug. 15, 2006 pp. 1-11.
Microsoft Corporation: "Clipboard: Adding Other Formats" MFC Library Reference 2006. Microsoft Corporation. http://msdn2.microsoft.com/en-us/library/838a3whf(VS.80).aspx Retrieved from the internet on Nov. 16, 2006.
Miller, Robert C., et al.; "Synchronizing Clipboards of Multiple Computers". http://delivery.acm.org/10.1145/330000/322584/p65-

(56) References Cited

OTHER PUBLICATIONS miller.pdf? UIST 1999, Asheville, N.C. http://www.cs.cmu.edu/~pebbles/papers/p65-miller-clipboards.pdf Published Date: 1999 pp. 1-2.
MSDN Frequently Asked Questions for Simple Sharing Extensions (SSE); Copyright Microsoft Corporation 2006 http://msdn.microsoft.com/xml/rss/ssefaq Dated: Dec. 14, 2006 pp. 1-4.
Nummi, Tomi; "The Technical Infrastructure of the LIVE Project". http://www.edu.helsinki.fi/media/mep6/nummi.pdf Published Date: Dec. 14, 2006 pp. 1-11.
Obasanjo, Dare; Metadata Quality, Events Databases and Live Clipboard. http://www.25hoursaday.com/weblog/2006/04/04/MetadataQualityEventsDatabasesAndLiveClipboard.aspx Dated: Apr. 3, 2006.
Stylos, Jeffrey, et al.; "Citrine: Providing Intelligent Copy-and-Paste". In Proceedings of ACM 2004 http://www.cs.cmu.edu/~citrine/CitrinePaper.pdf Dated: Oct. 24-27, 2004 pp. 1-8.
Zimbra; "A Pint of ALE-Ajax Linking and Embedding" http://www.zimbra.com/blog/archives/2006/04/zimbra_ale-ajax_linking_and_embedding.html Dated: Apr. 3, 2006 pp. 1-5.
Ozzie, Ray; "Blog: Wiring Progress" https://skydrive.live.com/view.aspx?cid=550F681DAD532637&resid=550F681DAD532637%2110958&app=Word Dated: Apr. 1, 2006 pp. 1-3.
Microsoft Team RSS Blog: SSE Update and Tutorial. http://blogs.msdn.com/rssteam/archive/2006/01/25/517473.aspx Dated: Jan. 25, 2006 pp. 1-3.
Shlegel, Cori.; "Simple Sharing Extensions Up Close" http://kinrowan.net/blog/wp/archives/2005/11/23/sse-up-close Dated: Nov. 23, 2005 pp. 1-9.
Microsoft Team RSS Blog: Simple Sharing Extensions for RSS and OPML http://blogs.msdn.com/rssteam/archive/2005/12/01/498704.aspx Dated: Dec. 1, 2005 pp. 1-6.
Microsoft Team RSS Blog: More on SSE http://blogs.msdn.com/rssteam/archive/2005/12/07/501326.aspx Dated: Dec. 7, 2005 pp. 1-2.
Ozzie, Ray; "Blog: Really Simple Sharing" http://rayozzie.spaces.live.com/blog/cns!FB301FBB9B2E142!175.entry Dated: Nov. 20, 2006 pp. 1-4.
Ozzie, Jack; "LIVE Clipboard" htt://spaces.live.com/editorial/rayozzie/demo/liveclip/specification/v092.html Dated: Apr. 21, 2006 pp. 1-15.
"LIVE Clipboard Technical Introduction", http://spaces.live.com/editorial/rayozzie/demo/liveclip/liveclipsample/techPreview.html Dated: Nov. 12, 2006 pp. 1-4.
"LIVE Clipboard Screencasts"; http://spaces.live.com/editorial/rayozzie/demo/liveclip/screencast/liveclipdemo.html Dated: Dec. 14, 2006 p. 1.
"LIVE Clipboard Example" http://spaces.live.com/editorial/rayozzie/demo/liveclip/liveclipsample/clipboardexample.html Dated: Dec. 18, 2006 pp. 1-2.
"LIVE Clipboard Wiring the Web-Ray Ozzie Want to Wire the Web" http://liveclipboard.org Dated: Dec. 18, 2006 pp. 1-2.
Ozzie, Jack; "Simple Sharing Extensions for RSS and OPML" http://msdn.microsoft.com/xml/rss/sse Published Date: Jan. 12, 2006 pp. 1-12.
Udell, Jon.; "Dueling Simplicities" http://weblog.infoworld.com/udell/2005/11/22.html Published Date: Nov. 22, 2005 pp. 1-4.
"Clipboard", http://msdn.microsoft.com/library/default.asp?url=/library/en-us/winui/windowsuserinterface/dataexchange/clipboard.asp Dated: Dec. 12, 2006 pp. 1-5.
Zaliva, Vadim, et al.; "Enhanced "Enlosures" Support in RSS and Atom Syndication", http://www.crocodile.org/lord/RSSenclosures/RSSenclosures.pdf Dated: Dec. 15, 2004 pp. 1-18.
Roisin, Cecile.; "Implementing the Cut and Paste Operation in a Structured Editing System" http://citeseerx.ist.psu.edu/viewdoc/summary?doi=10.1.1.31.6068 Published Date: Mar. 1994 pp. 1-14.
Spinellis, Diomidis D.; "Outwit: Unix Tool-based Programming Meets the Windows World", In Christopher Small, editor, USENIX 2000 Technical Conference Proceedings, pp. 149-158, Berkley, CA http://www.spinellis.gr/pubs/conf/2000-Usenix-outwit/html/utool.html Published Date: Jun. 2000.
"Live Share Plus-Multi-point Data Conferencing Software" 1997 PictureTel Corporation. http://www.polycom.com/common/pw_cmp_updateDocKeywords/0,1687,573,00.pdf Published Date: 1997 pp. 1-2.
Winer, Dave; "RFC Meta Weblog API" http://www.xmlrpc.com/metaweblogApi Published Date: Mar. 14, 2002 pp. 1-4.
"RSSOwl/RSS/RDF/Atom Newsreader", http://www.dirfile.com/rssowl_rss_rdf_atom_newsreader.htm Published DAte: Feb. 1, 2007 pp. 1-3.
Yang, Mao, et al.; "Deployment of a Large-scale Peer to Peer Social Network". Microsoft Research Asia; Beijing, China. http://research.microsoft.com/pubs/69160/maze.pdf Published Date: Dec. 14, 2006 pp. 1-6.
"vCard: The Electronic Business Card", A Versit Consortium White Paper. http://www.imc.org/pdi/vcardwhite.html Published Date: Jan. 1, 1997 pp. 1-5.
Rimey, Ken.; "Version Headers for Flexible Synchronization and Conflict Resolution". http://www.hiit.fi/publications/pub_files/hiit-2004-3.pdf Published Date: Nov. 22, 2004 pp. 1-14.
"Snarfer", http://www.snarfware.com/download.htm Last entered: Dec. 14, 2006 pp. 1-3.
Amendment cited in related U.S. Appl. No. 12/113,214 dated: Sep. 9, 2012 pp. 4.
Amendment cited in related U.S. Appl. No. 12/113,214 dated: Sep. 11, 2012 pp. 12.
Notice of Allowance cited in related U.S. Appl. No. 12/113,214 dated: Apr. 12, 2012 pp. 14.
Notice of Allowance cited in related U.S. Appl. No. 12/113,214 dated: Jan. 26, 2012 pp. 23.
Amendment cited in related U.S. Appl. No. 12/113,214 dated: Dec. 21, 2011 pp. 22.
Notice of allowance cited in related U.S. Appl. No. 12/113,214 dated: Sep. 21, 2011 pp. 24.
Notice of allowance cited in related U.S. Appl. No. 12/113,214 dated: Jun. 11, 2012 pp. 22.
Notice of allowance cited in related U.S. Appl. No. 11/557,004 dated: Jun. 14, 2011 pp. 28.
Notice of allowance cited in related U.S. Appl. No. 11/557,004 dated: May 13, 2011 pp. 17.
Amendment cited in related U.S. Appl. No. 11/557,004 dated: Oct. 8, 2010 pp. 18.
Final office action cited in related U.S. Appl. No. 11/557,004 dated: Jul. 23, 2010 pp. 29.
Amendment cited in related U.S. Appl. No. 11/557,004 dated: Apr. 12, 2010 pp. 16.
Amendment cited in related U.S. Appl. No. 11/557,004 dated: Sep. 14, 2009 pp. 14.
Amendment cited in related U.S. Appl. No. 11/557,004 dated: May 23, 2011 pp. 11.
Non Final office action cited in related U.S. Appl. No. 11/557,004 dated: Nov. 12, 2009 pp. 27.
Non Final office action cited in related U.S. Appl. No. 11/557,004 dated: Nov. 18, 2008 pp. 44.
Amendment cited in related U.S. Appl. No. 11/557,004 dated: Feb. 18, 2009 pp. 17.
Final office action cited in related U.S. Appl. No. 11/557,004 dated: Jun. 12, 2009 pp. 22.
Non Final office action cited in related U.S. Appl. No. 11/621,423 dated: Mar. 18, 2009 pp. 25.
Amendement cited in related U.S. Appl. No. 11/621,423 dated: Jun. 18, 2009 pp. 15.
Final office action cited in related U.S. Appl. No. 11/621,423 dated: Oct. 16, 2009 pp. 15.
Amendment cited in related U.S. Appl. No. 11/621,423 dated: Dec. 16, 2009 pp. 17.
Non Final office action cited in related U.S. Appl. No. 11/621,423 dated: Apr. 1, 2010 pp. 15.
Amendment cited in related U.S. Appl. No. 11/621,423 dated: Jun. 30, 2010 pp. 19.

(56) References Cited

OTHER PUBLICATIONS

Notice of allowance cited in related U.S. Appl. No. 11/621,423 dated: Oct. 7, 2010 pp. 20.
Amendment cited in related U.S. Appl. No. 11/621,423 dated: Jan. 6, 2011 pp. 19.
Notice of allowance cited in related U.S. Appl. No. 11/621,423 dated: Sep. 16, 2011 pp. 28.
Amendment cited in related U.S. Appl. No. 11/621,423 dated: Dec. 16, 2011 pp. 14.
Notice of allowance cited in related U.S. Appl. No. 11/621,423 dated: Mar. 21, 2012 pp. 28.
Amendment cited in related U.S. Appl. No. 11/621,423 dated: Jun. 21, 2012 pp. 13.
Notice of allowance cited in related U.S. Appl. No. 11/621,423 dated: Oct. 15, 2012 pp. 22.
Amendment cited in related U.S. Appl. No. 11/621,423 dated: Jan. 15, 2013 pp. 11.
Final office action cited in related U.S. Appl. No. 11/621,433 dated: Aug. 28, 2012 pp. 20.
Amendment cited in related U.S. Appl. No. 11/621,433 dated: Jul. 13, 2012 pp. 19.
Non Final office action cited in related U.S. Appl. No. 11/621,433 dated: Mar. 14, 2012 pp. 33.
Amendment cited in related U.S. Appl. No. 11/621,433 dated: Mar. 24, 2011 pp. 19.
Final office action cited in related U.S. Appl. No. 11/621,433 dated: Jan. 27, 2011 pp. 29.
Amendment cited in related U.S. Appl. No. 11/621,433 dated: Nov. 26, 2010 pp. 36.
Non Final office action cited in related U.S. Appl. No. 11/621,433 dated: Aug. 31, 2010 pp. 17.
Amendment cited in related U.S. Appl. No. 11/621,433 dated: May 15, 2010 pp. 19.
Final office action cited in related U.S. Appl. No. 11/621,433 dated: Mar. 18, 2010 pp. 17.
Amendment cited in related U.S. Appl. No. 11/621,433 dated: Nov. 19, 2009 pp. 13.
Non Final office action cited in related U.S. Appl. No. 11/621,433 dated: Aug. 20, 2009 pp. 29.
Ozzie, "Transferring Structured Information with References", U.S. Appl. No. 11/609,717, filed Dec. 12, 2006.
Ozzie, "Transferring Structured Information", U.S. Appl. No. 11/556,998, filed Nov. 6, 2006.
Augustine, "Clipboard Interaction", U.S. Appl. No. 11/539,058, filed Oct. 5, 2006.
Bill Burcham, "Half a Baby Step", http://lesscode.org/2005/11/02/half-a-baby-step/, Nov. 2, 2005. 5 pages.
Radic, Radowan, "Intercept paste event in Text Widget", EclipseZone (online), <http://www.eclipsezone.com/eclipse/forums/t69203.html>, Apr. 10, 2006. 7 pages.
Reimer, Yolanda J. et al., "Implementation Challenges Associated With Developing a Web-Based E-Notebook", Journal of Digital Information, vol. 4, No. 3, (Jan. 1, 2004). 14 pages.
"iNetForm Filler", <http://www.inetformfiller.com/site/en/main/form-filler-features.html>, 2006. 2 pages.
"Introducing Operator", <http://labs.mozilla.com/2006/12/introducing-operator>, 2006. 14 pages.
Copy and Paste', JRWhipple & Associates, <http://www.jrwhipple.com/sup_copypaste.html>, 2000. 1 page.
"Kaboodle Get Started", <http://www.kaboodle.com/zd/help/getStarted.html>, 2007. 4 pages.
"M8 Multi Clipboard 9.40.00", <http://www.vista-files.org/programs/m8-software-uk/m8-multi-clipboard.html>, 2006. 10 pages.
Kaply, Michel, "Mozilla Corporation", <https://addons.mozilla.org/firefox/4106/>, 2007. 4 pages.
Boodman, Aaron, "Mozilla Corporation", <https://addons.mozilla.org/firefox/748>, 2007. 3 pages.
Mahler, Gary, "Next Generation Warehousing with Version 9", <http://www2.sas.com/proceedings/sugi281169-28.pdf>, 2003, 10 pages.
"Zotero—The Next-Generation Research Tool", <http://www.zotero.org/>, 2007. 3 pages.
U.S. Appl. No. 11/707,212—Non Final Office Action Mailed Jun. 15, 2009. 26 pages.
U.S. Appl. No. 11/707,212—Response to Non Final Office Action Mailed Jun. 15, 2009, filed Sep. 15, 2009. 17 pages.
U.S. Appl. No. 11/707,212—Final Office Action Mailed Jan. 25, 2010. 17 pages.
U.S. Appl. No. 11/707,212—RCE-Response to Final Office Action Mailed Jan. 25, 2010, filed Mar. 5, 2010. 16 pages.
Response Filed Apr. 15, 2015 to the Non-Final Office Action Mailed Jan. 15, 2015 From U.S. Appl. No. 13/017,727. 15 pages.
Final Office Action Mailed May 1, 2015 From U.S. Appl. No. 13/017,727. 12 pages.
U.S. Appl. No. 11/621,423—Notice of Allowance Mailed Feb. 1, 2013. 7 pages.
U.S. Appl. No. 11/621,423—Amendment After Notice of Allowance (Rule 312) filed Apr. 11, 2013. 8 pages.
U.S. Appl. No. 11/621,423—Response to Amendment After Notice of Allowance (Rule 312) filed Apr. 11, 2013 Mailed May 24, 2013. 2 pages.
U.S. Appl. No. 13/017,727—Non Final Office Action Mailed Feb. 1, 2013. 14 pages.
U.S. Appl. No. 13/017,727—Response to Non Final Office Action Mailed Feb. 1, 2013, filed May 1, 2012. 11 pages.
U.S. Appl. No. 13/017,727—Final Office Action Mailed May 24, 2013. 12 pages.
U.S. Appl. No. 13/017,727—RCE-Response to Final Office Action Mailed May 24, 2013, filed Aug. 26, 2013. 13 pages.
U.S. Appl. No. 13/017,727—Non Final Office Action Mailed Oct. 8, 2013. 11 pages.
U.S. Appl. No. 13/017,727—Response to Non Final Office Action Mailed Oct. 8, 2013, filed Jan. 8, 2014. 11 pages.
U.S. Appl. No. 13/017,727—Final Office Action Mailed May 23, 2014. 11 pages.
U.S. Appl. No. 13/017,727—RCE-Response to Final Office Action Mailed May 23, 2014, filed Aug. 25, 2014. 14 pages.
U.S. Appl. No. 13/017,727—Non Final Office Action Mailed Jan. 15, 2015. 11 pages.
U.S. Appl. No. 12/113,214—Amendment after Notice of Allowance Mailed Sep. 11, 2013. 10 pages.
U.S. Appl. No. 13/619,442—Non Final Office Action Mailed Jan. 9, 2013 10 pages.
U.S. Appl. No. 13/619,442—Response to Non Final Office Action Mailed Jan. 9, 2013, filed Apr. 9, 2013. 10 pages.
U.S. Appl. No. 13/619,442—Final Office Action Mailed Apr. 25, 2013. 13 pages.
U.S. Appl. No. 13/619,442—RCE-Response to Final Office Action Mailed Apr. 25, 2013, filed Jul. 25, 2013. 13 pages.
U.S. Appl. No. 13/619,442—Non Final Office Action Mailed Nov. 19, 2013. 13 pages.
U.S. Appl. No. 13/619,442—Response to Non Final Office Action Mailed Nov. 19, 2013, filed Feb. 19, 2014. 10 pages.
U.S. Appl. No. 13/619,442—Final Office Action Mailed May 22, 2014. 13 pages.
U.S. Appl. No. 13/619,442—RCE-Response to Final Office Action Mailed May 22, 2014, filed Aug. 22, 2014. 13 pages.
U.S. Appl. No. 13/619,442—Non Final Office Action Mailed Nov. 19, 2014. 10 pages.
U.S. Appl. No. 13/619,442—Response to Non Final Office Action Mailed Nov. 19, 2014, filed Feb. 19, 2015. 11 pages.
Voloh et al., "Fault Locator Based on Line Current Differential Relay Synchronized Measurements", Developments in Power System Protection (DPSP 2010). Managing the Change;10th IET International Conference held Mar. 29, 2010 through Apr. 1, 2010 Protective Relay Engineers. 5 pages.
Zhao et al., "Multicasting in Delay Tolerant Networks: Semantic Models and Routing Algorithms", ACM SIGCOMM, 2005. 8 pages.
Li et al., "Gateway Placement for Throughput Optimization in Wireless Mesh Networks", Springer, Mobile Netw. Applications, 13:198-211, 2008.
Stuedi et al., "Wherestore: Location Based Data Storage for Mobile Devices Interacting with the Cloud", ACM MCS, 2010. 8 pages.

(56) References Cited

OTHER PUBLICATIONS

Ozzie et al., "XML Developer Center: Simple Sharing Extensions for RSS and OPML", Microsoft, Ver. 91, Jan. 12, 2006. 9 pages.
U.S. Appl. No. 11/739,236—Non Final Office Action Mailed Jul. 29, 2010. 22 pages.
U.S. Appl. No. 11/739,236—Response to Non Final Office Action Mailed Jul. 29, 2010, filed Oct. 7, 2010. 15 pages.
U.S. Appl. No. 11/739,236—Notice of Allowance Mailed Oct. 25, 2010. 7 pages.
U.S. Appl. No. 13/011,648—Non Final Office Action Mailed Aug. 30, 2012. 12 pages.
U.S. Appl. No. 13/011,648—Response to Non Final Office Action Mailed Aug. 30, 2012, filed Nov. 30, 2012. 12 pages.
U.S. Appl. No. 13/011,648—Final Office Action Mailed Jan. 31, 2013. 15 pages.
U.S. Appl. No. 13/011,648—RCE-Response to Final Office Action Mailed Jan. 31, 2013, filed May 30, 2013. 17 pages.
U.S. Appl. No. 13/011,648—Supplemental Response to Final Office Action Mailed Jan. 31, 2013, filed Aug. 16, 2013. 9 pages.
U.S. Appl. No. 13/011,648—Non Final Office Action Mailed Sep. 10, 2013. 28 pages.
U.S. Appl. No. 13/011,648—Response to Non Final Office Action Mailed Sep. 10, 2013, filed Nov. 25, 2013. 11 pages.
U.S. Appl. No. 13/011,648—Final Office Action Mailed Feb. 6, 2014. 33 pages.
U.S. Appl. No. 13/011,648—RCE-Response to Final Office Action Mailed Feb. 6, 2014, filed Apr. 16, 2014. 13 pages.
U.S. Appl. No. 13/011,648—Non Final Office Action Mailed Jul. 18, 2014. 34 pages.
U.S. Appl. No. 13/011,648—Response to Non Final Office Action Mailed Sep. 12, 2014. 13 pages.
U.S. Appl. No. 13/011,648—Final Office Action Mailed Dec. 5, 2014. 34 pages.
U.S. Appl. No. 11/707,212—Non Final Office Action Mailed Oct. 28, 2010. 15 pages.
U.S. Appl. No. 11/707,212—Response to Non Final Office Action Mailed Oct. 28, 2010, filed Nov. 22, 2010. 22 pages.
U.S. Appl. No. 11/707,212—Final Office Action Mailed Feb. 17, 2011. 19 pages.
U.S. Appl. No. 11/707,212—RCE-Response to Final Office Action Mailed Feb. 17, 2011, filed Mar. 30, 2011. 21 pages.
U.S. Appl. No. 11/707,212—Non Final Office Action Mailed Nov. 28, 2011. 19 pages.
U.S. Appl. No. 11/707,212—Response to Non Final Office Action Mailed Nov. 28, 2011, filed Mar. 2, 2012. 18 pages.
U.S. Appl. No. 11/707,212—Non Final Office Action Mailed Jun. 13, 2012. 25 pages.
U.S. Appl. No. 11/707,212—Response to Non Final Office Action Mailed Jun. 13, 2012, filed Sep. 13, 2012. 20 pages.
U.S. Appl. No. 11/707,212—Notice of Allowance Mailed Dec. 19, 2012. 8 pages.
U.S. Appl. No. 11/707,212—Notice of Allowance Mailed Mar. 13, 2013. 5 pages.
"PCT Search Report and Written Opinion", Mailed Jul. 18, 2008, From PCT Application No. PCT/US2008/053728. 10 pages.
Office Action Mailed Aug. 11, 2010 From Chinese Patent Application No. 200880005014.5. 9 pages.
Office Action Mailed Apr. 14, 2011 From Chinese Patent Application No. 200880005014.5. 10 pages.
Office Action Mailed Sep. 14, 2011 From Chinese Patent Application No. 200880005014.5. 10 pages.
Notice of Allowance Mailed Jun. 5, 2012 From Chinese Patent Application No. 200880005014.5. 6 pages.
Extended European Search Report Mailed Mar. 20, 2012 From European Patent Application No. 08729661.2. 7 pages.
Office Action Mailed Apr. 9, 2013 From European Patent Application No. 08729661.2. 8 pages.
Response to Office Action Mailed Apr. 9, 2013 From European Patent Application No. 08729661.2, Filed Aug. 19, 2013. 11 pages.
Summons to Attend Oral Proceedings Mailed Jan. 2, 2014 From European Patent Application No. 08729661.2. 10 pages.
Office Action Mailed Nov. 10, 2012 From Japanese Patent Application No. 2009-549687. 8 pages.
Notice of Allowance Mailed Aug. 6, 2013 From Japanese Patent Application No. 2009-549687.
Notice of Allowance Mailed May 21, 2014 From European Patent Application No. 08729661.2. 7 pages.
U.S. Appl. No. 11/674,054—Non Final Office Action Mailed Jul. 24, 2009. 19 pages.
U.S. Appl. No. 11/674,054—Response to Non Final Office Action Mailed Jul. 24, 2009, filed Nov. 19, 2009. 15 pages.
U.S. Appl. No. 11/674,054—Final Office Action Mailed Mar. 8, 2010. 29 pages.
U.S. Appl. No. 11/674,054—RCE-Response to Final Office Action Mailed Mar. 8, 2010, filed Jun. 30, 2010. 18 pages.
U.S. Appl. No. 11/674,054—Non Final Office Action Mailed Oct. 19, 2011. 24 pages.
U.S. Appl. No. 11/674,054—Response to Non Final Office Action Mailed Oct. 19, 2011, filed Dec. 29, 2011. 16 pages.
U.S. Appl. No. 11/674,054—Final Office Action Mailed Mar. 16, 2012. 33 pages.
U.S. Appl. No. 11/674,054—RCE-Response to Final Office Action Mailed Mar. 16, 2012, filed Jul. 2, 2012. 20 pages.
U.S. Appl. No. 11/674,054—Non Final Office Action Mailed Dec. 31, 2012. 25 pages.
U.S. Appl. No. 11/674,054—Response to Non Final Office Action Mailed Dec. 31, 2012, filed Apr. 30, 2013. 16 pages.
U.S. Appl. No. 11/674,054—Notice of Allowance Mailed Sep. 5, 2013. 20 pages.
U.S. Appl. No. 11/674,054—RCE-Supplemental Response to Notice of Allowance Mailed Sep. 5, 2013, filed Nov. 23, 2013. 15 pages.
U.S. Appl. No. 11/674,054—Notice of Allowance Mailed Jan. 30, 2014. 8 pages.
U.S. Appl. No. 11/674,054—RCE-IDS Response to Notice of Allowance Mailed Jan. 30, 2014, filed Mar. 12, 2014. 3 pages.
U.S. Appl. No. 11/674,054—Notice of Allowance Mailed Mar. 24, 2014. 8 ppages.
U.S. Appl. No. 11/741,091—Non Final Office Action Mailed Jul. 9, 2009. 7 pages.
U.S. Appl. No. 11/741,091—Response to Non Final Office Action Mailed Jul. 9, 2009, filed Oct. 9, 2009. 10 pages.
U.S. Appl. No. 11/741,091—Notice of Allowance Mailed Jan. 11, 2010. 8 pages.
U.S. Appl. No. 11/692,700—Non Final Office Action Mailed Feb. 19, 2009. 17 pages.
U.S. Appl. No. 11/692,700—Response to Non Final Office Action Mailed Feb. 19, 2009, filed May 19, 2009. 17 pages.
U.S. Appl. No. 11/692,700—Final Office Action Mailed Aug. 21, 2009. 19 pages.
U.S. Appl. No. 11/692,700—RCE-Response to Final Office Action Mailed Aug. 21, 2009, filed Oct. 1, 2009. 13 pages.
U.S. Appl. No. 11/692,700—Non Final Office Action Mailed Dec. 22, 2009. 21 pages.
U.S. Appl. No. 11/692,700—Response to Non Final Office Action Mailed Dec. 22, 2009, filed Mar. 15, 2010. 10 pages.
U.S. Appl. No. 11/692,700—Final Office Action Mailed Jun. 11, 2010. 21 pages.
U.S. Appl. No. 11/692,700—RCE-Response to Final Office Action Mailed Jun. 11, 2010, filed Aug. 9, 2010. 15 pages.
U.S. Appl. No. 11/692,700—Non Final Office Action Mailed Sep. 17, 2010. 29 pages.
U.S. Appl. No. 11/692,700—Response to Non Final Office Action Mailed Sep. 17, 2010, filed Dec. 17, 2010. 14 pages.
U.S. Appl. No. 11/692,700—Final Office Action Mailed Mar. 16, 2011, 30 pages.
U.S. Appl. No. 11/532,390—Preliminary Amendment Dated Aug. 15, 2007. 10 pages.

* cited by examiner

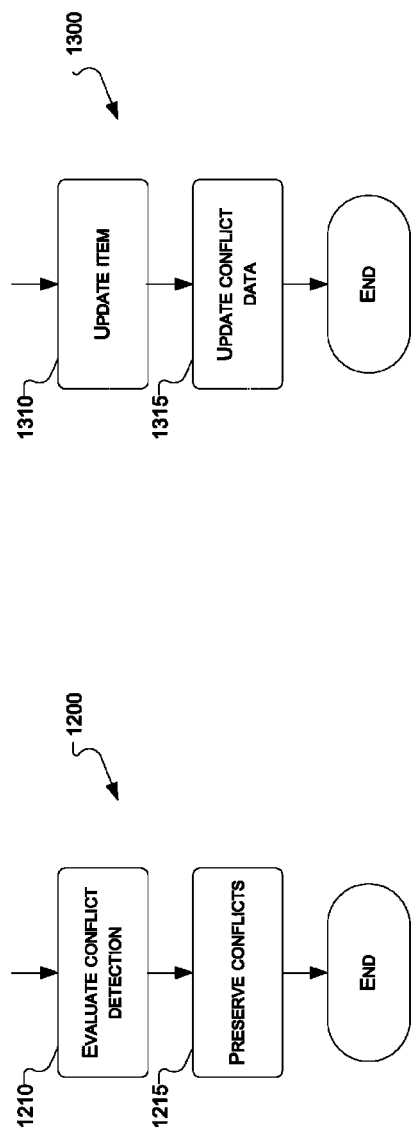

DATA SYNCHRONIZATION AND SHARING RELATIONSHIPS

RELATED APPLICATION

This application is a continuation of U.S. application Ser. No. 11/532,390, filed on Sep. 15, 2006, entitled "DATA SYNCHRONIZATION AND SHARING RELATIONSHIPS" and U.S. Application No. 60/805,056, filed on Jun. 16, 2006, entitled "SHARING OF PERSONAL INFORMATION MANAGEMENT DATA," at least some of at least one of which may be incorporated herein.

BACKGROUND

As more people manage data using computer applications, like personal data in personal information management (PIM) applications, the cases where people want to share such information with other people grow. For example, people might like to be able to share data items, including contacts, calendar items, and so on, with family members, work colleagues, and other acquaintances. They may want to share different sets of information with different sets of people, and they may want to receive changes to the data made by the people with which they share their data. In addition, people that want to share information often use different applications and environments, and may have their data stored in different formats. For example, a person might use one type of PIM application at work and another type of PIM application at home, while their friend uses yet another type of PIM application. However, the same person may still want to share information between all of these applications.

SUMMARY

The following presents a simplified summary of the disclosure in order to provide a basic understanding to the reader. This summary is not an extensive overview of the disclosure and does not identify key or critical elements of the claimed subject matter or delineate the scope of the claimed subject matter. Its sole purpose is to present some concepts disclosed herein in a simplified form as a prelude to the more detailed description that is presented later.

Described herein are various technologies and techniques directed to the sharing of information, including technologies and techniques that use sharing relationships. Sharing may be accomplished in a variety of ways, including by interfacing with an application that manages or accesses the data to be shared, and by making shared data available using a feed along with some mechanism for tracking changes or enabling synchronization between different endpoints. Information that is shared may be stored or shared using a wide variety of data types.

DESCRIPTION OF THE DRAWINGS

FIG. 12 illustrates an exemplary generalized operational flow that includes operations that might be performed when processing conflicts.

FIG. 13 illustrates an exemplary generalized operational flow that includes operations that might be performed as part of resolving conflicts.

DETAILED DESCRIPTION

Figure 1:
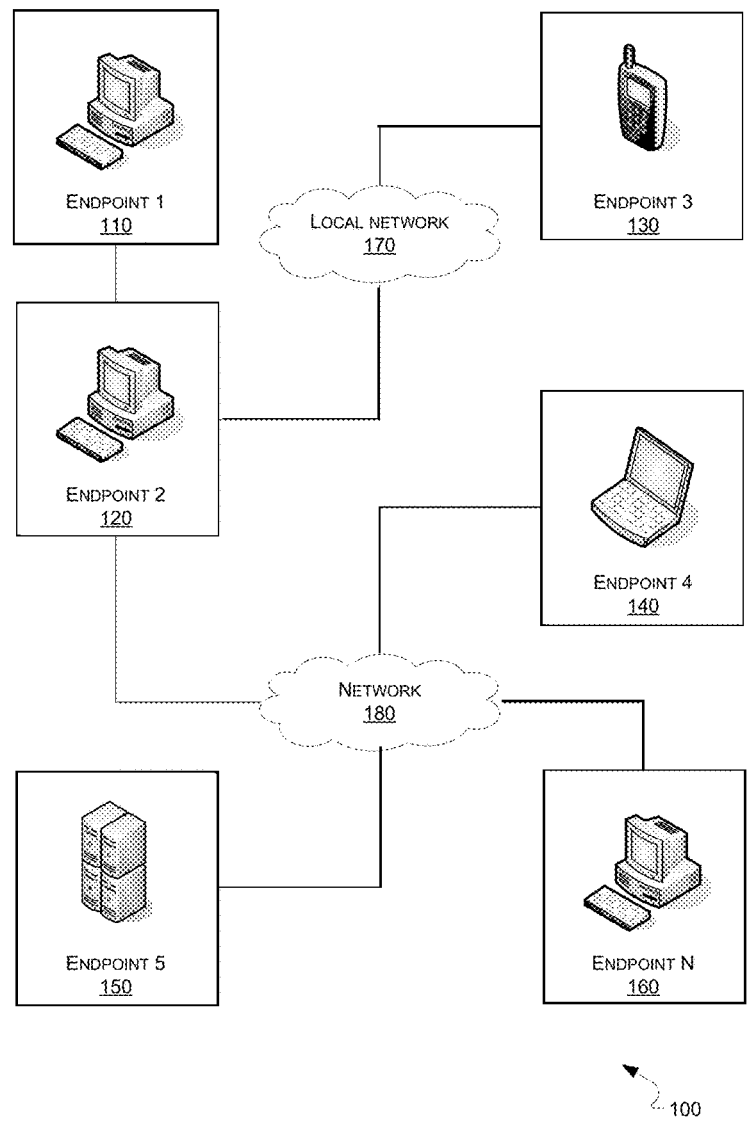
FIG. 1 illustrates an exemplary system in which sharing of data items might be implemented.

The disclosed subject matter extends to various technologies and techniques directed to the sharing of information. The shared information may comprise a wide variety of data types, including information managed by PIM applications like contacts (data about people), calendar items, emails, tasks, notes, and so on, as well as other types of information. Sharing may be accomplished in a variety of ways, including by interfacing with an application that manages or accesses the data to be shared, and by making shared data available using a feed, like an RSS ("Really Simple Syndication" or "Rich Site Summary") or Atom feed, along with some mechanism for tracking changes or enabling synchronization between different endpoints, like Simple Sharing Extensions (SSE).

In some implementations, sharing may be performed by a sharing module or "add-in" that interfaces with an application (or other executable code), like a PIM application, where the sharing module enables users to share and synchronize data items including those managed by the application or executable code. In embodiments where the application includes a PIM application, such data items might include contacts, calendar items, and so on. A user or particular endpoint may have the ability to publish a set of data, such as contacts and/or calendar items (including a heterogeneous combination of multiple types of data), to which another endpoint may subscribe in order to receive additions and changes to such data.

A sharing module might use a protocol such as the Simple Sharing Extensions (SSE) protocol in combination with a feed protocol like RSS or Atom as part of an implementation that provides sharing functionality. For example, in some implementations like this, publishing a set of data items may create an RSS feed that includes SSE data, other RSS data, and a set of RSS enclosures with the actual data itself. For example, an RSS feed might contain references to enclosures—perhaps using the RSS "enclosure" element—and the enclosures themselves may contain, for example, contact data (perhaps represented using vCard) or calendar data (perhaps represented using iCal).

After a set of data items are published in a feed, another user or endpoint may then subscribe to the feed. After this subscription, changes made by the first endpoint to the published data may be reflected in the first endpoint's feed, and then updated in the second endpoint's data, through the use of, among other things, a sharing module on the second endpoint.

The communication between endpoints using such sharing techniques may be described as peer-to-peer, or without a central server, in some implementations. Depending on the types of data items that are shared, such techniques may also be used to provide a variety of features outside of, for example, sharing particular contacts and calendar items with multiple users. For example, if such sharing techniques are applied to the communication of email messages, they might implement a system for transmitting email messages that, with some implementations, might replace a traditional server-based email transmission system.

Depending on the desired type of sharing, both read-only and read/write sharing relationships may be implemented. In a read-only, or publish-only, relationship, one endpoint may publish data but may not accept changes from other endpoints. In contrast, in a read/write, or two-way, relationship the endpoint that publishes a feed may then also subscribe to a corresponding feed published by a subscribing endpoint, and changes made by the second endpoint may be reflected in the first endpoint's data.

The feeds may use any of a variety of extensions or data necessary to enable synchronization and sharing in the context of a feed. SSE, as an extension to a variety of types of feeds that enables synchronization of data using feeds, is one example of such an extension or data.

Turning now to FIG. 1, shown therein is an exemplary system 100 in which sharing of data items might be implemented. While this description of FIG. 1 may be made with reference to other figures, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

The exemplary system 100 may contain endpoint 1 110, endpoint 2 120, endpoint 3 130, endpoint 4 140, endpoint 5 150, and endpoint N 160. Most generally, any of these endpoints may be one or more computing devices. For example, an endpoint might be a general-purpose or dedicated computer, including a desktop computer, a laptop computer, a workstation computer, or the like. An endpoint might also be a one or more server computers that, among other things, might provide one or more services accessible to members of the system. Further, an endpoint might be a mobile or cellular telephone, connected personal digital assistant (PDA), media player, or other portable device. Some of the illustrated endpoints are shown as connected using an exemplary local network 170, other endpoints are shown as connected using an exemplary network 180, which might represent a larger network, such as the Internet, while yet other endpoints are shown as connected to each other directly.

Generally, a sharing relationship may exist between two endpoints. For example, endpoint 1 110 might have a sharing relationship with endpoint 2 120, and so on. In a sharing relationship, one endpoint may share or synchronize data items, or just "items," with another endpoint, or two endpoints may share or synchronize items with each other.

An endpoint in a sharing relationship may be a publisher, a subscriber, or both a publisher and a subscriber. A publisher may generally make available a "feed" that contains information associated with the items being shared as part of the sharing relationship. A subscriber may then be an endpoint that subscribes to a feed provided by a publisher. In the case where both endpoints in a sharing relationship are publishers and subscribers, each endpoint may make available a feed to which the other endpoint subscribes.

A variety of entities, including users, automated processes, and so on, may modify data that may be part of a sharing relationship. For example, a user might use a PIM application to modify the address associated with a contact. A change of this nature—one that is made outside of a "merge" (as described below)—may be referred to as a "local" change. A local change, or the changed item, may then be published as part of a feed. If the other endpoint in a sharing relationship subscribes to the feed that contains the change, it may "merge" the change into its own local store of items. The other endpoint may also make local changes of its own, which may then, in some sharing relationships, be merged or incorporated by the other endpoint. Any changes made on the subscribing endpoint as a result of a merge may also be made available in the subscribing endpoint's feed.

In general, any of the endpoints illustrated in the exemplary system 100 might be endpoints that participate in a sharing relationship with another endpoint. The particular type or purpose of an endpoint may not be relevant, as long as the endpoint can follow the necessary processes for sharing data, as will be described herein. Similarly, the manner in which an endpoint is connected to another endpoint may not be relevant, as long as both endpoints have some mechanism by which they can access feeds and data and publish feeds and data. Such mechanisms might consist of a network connection between two endpoints as is illustrated, for example, by the connection between, among other endpoints, endpoint 2 120 and endpoint 4 140, which are connected using the network 180. Endpoints may also be connected without regard for a network like the network 180, and may be, for example, connected directly through some wired or wireless means of communication, or perhaps even by the transfer of physical media, like a compact disc (CD) or flash memory drive. Such connection might be illustrated by, for example, the connection between endpoint 1 110 and endpoint 2 120. Furthermore, two or more logical endpoints may be implemented on a single computing device.

While in some implementations sharing relationships may exist between two endpoints, it is also possible for a particular set of items to be shared with or between any number of endpoints. This may be accomplished through a variety of arrangements or topologies of endpoints. For example, suppose that in the exemplary system 100 that all endpoints synchronize the same set of items. One arrangement in which this might be implemented might be one in which all of the endpoints share data with endpoint 2 120. For example, endpoint 1 110 might have a sharing relationship with endpoint 2 for the set of items; endpoint 3 130 might have a sharing relationship with endpoint 2 for the same set of items, and so on, to endpoint N 160. In such an example, a change made by, say, endpoint 1 might first be shared with endpoint 2, and then be shared by endpoint 2 with endpoint 3. In another exemplary arrangement, an endpoint like endpoint 4 140 might have a sharing relationship for a particular set of items with endpoint 5 150. Endpoint 5 might also have a sharing relationship with endpoint 2. While in this example endpoint 4 does not have a sharing relationship with endpoint 2, changes made by endpoint 4 may still be shared with endpoint 2, if, for example, endpoint 5 has a sharing relationship for the same set of items with endpoint 2.

It should be noted again that in some implementations, not all endpoints both publish a feed and subscribe to a corresponding feed. For example, some endpoints may only publish, but not subscribe, to a feed related to a particular set of data. Such endpoints may publish information about local changes made by that endpoint, but may not incorporate changes made by another endpoint. Further, other arrangements of publishing and subscribing actions may be contemplated or implemented depending on the requirements of the particular scenario or situation.

In some implementations, a particular set of two endpoints might have more than one sharing relationship if they share more than one set of data. In other implementations, a sharing relationship might be defined to include all of the data shared between two endpoints, even if it includes more than one set of data.

Figure 2:
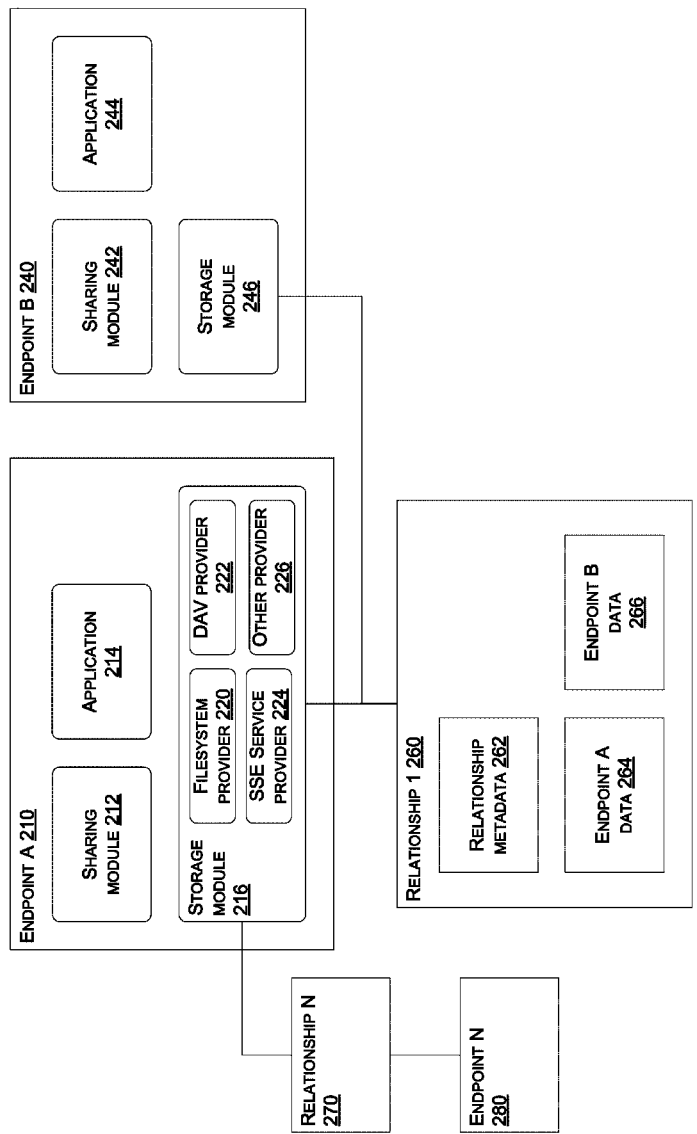
FIG. 2 illustrates an exemplary system that demonstrates some elements that might be a part of the sharing of data items.

Turning now to FIG. 2, shown therein is an exemplary system 200 that demonstrates some elements that might be a part of the sharing of data items. This description of FIG. 2 may be made with reference to other figures. However, it should be understood that the elements described with reference to FIG. 2 are not intended to be limited to being used with the elements described with reference to other figures. In addition, while the exemplary diagram in FIG. 2 indicates particular elements, in some implementations not all of these elements may exist, and in some implementations additional elements may exist. Furthermore, while the exemplary diagram shows some elements as being part of or contained by a particular computing device or endpoint, for example, it should be noted that one or more modules or elements may also be implemented by one or more other endpoints or computing devices and connected to other endpoints or computing devices by any means sufficient for exchanging any necessary data.

The exemplary system 200 contains an exemplary endpoint A 210, an exemplary endpoint B 240, an exemplary endpoint N 280, an exemplary relationship 1 260, and an exemplary relationship N 270. The exemplary endpoint A 210 is shown as including a sharing module 212, an application 214, and a storage module 216, which in turn is associated with a set of providers including a filesystem provider 220, a DAV provider 222, an SSE Service provider 224, and another provider 226. The exemplary endpoint B is similarly shown as being associated with a sharing module 242, an application 244, and a storage module 246. The exemplary relationship 1 260 is shown as including relationship metadata 262, endpoint A data 264, and endpoint B data 266.

In some implementations, endpoint A 210 may have a sharing relationship with endpoint B 240, and share items with endpoint B 240, for example, as is described herein. In the same or other implementations, endpoint B may share items with endpoint A. Similarly, endpoint A and/or endpoint B might share items with endpoint N 280, or with another endpoint that is not shown. Any of endpoint A, endpoint B, and endpoint N, might be similar to or the same as one of the endpoints previously described with reference to FIG. 1.

As used herein, the term "sharing relationship" or "relationship" may refer to a relationship between two endpoints for sharing some set of data items. For example, if a user wanted to share particular contacts with one of their co-workers, the user might create a sharing relationship with that co-worker. In such a relationship the user might be associated with one endpoint and the co-worker might be associated with the other. In some implementations the endpoints themselves might be computing devices running an application, like a PIM application, and the executable code associated with a sharing module, storage module, and the like. In the same or other implementations a single user might run the executable code necessary for data sharing on more than one computing device to, for example, share data between multiple computing devices. In some of these implementations, each computing device might be considered an endpoint, even if the computing devices are associated with a single user.

In some implementations, a sharing module, like the exemplary sharing module 212 of endpoint A 210, might implement a variety of executable operations as part of sharing items with other endpoints. For example, a sharing module might create relationships with other endpoints for sharing items. It might also share items associated with the endpoint, and access and merge data from items associated with other endpoints. Some of the methods that might be implemented by or associated with the sharing module are described herein, for example, with reference to FIG. 3, FIG. 4, FIG. 5, FIG. 6, and so on.

The exemplary application 214 may represent one or more applications or other executable code with which a variety of items might be associated. For example, the application 214 might be, in some implementations, a PIM application that manages and maintains information like contacts, calendar items like appointments, tasks, emails, notes, and so on. In the same or other implementations, the application 214 might access other types of data items. In some cases such information may be stored using storage that is a part of the computing device or devices that comprise endpoint A 210, while in other implementations some or all of the information may be stored on a variety of other computing devices or stores, including devices or stores that are connected to endpoint A by, for example, a network. In some of these implementations, the application 214 might represent, for example, a web browser that accesses information stored on one or more server computers. Such might be the case, for example, when application 214 is a web browser displaying email, calendar, contact, and other information maintained by one or more servers.

The exemplary storage module 216 might, in some implementations, provide access to a variety of data related to sharing items. Such data might include information related to relationships, like relationship metadata 262, endpoint A data 264, and endpoint B data 266. In some or all of these implementations, the storage module might be used by the sharing module 212 when the sharing module performs particular executable operations to share items.

In at least some implementations the items maintained by the application 214 may be stored, accessed, and managed separately from the data stored by the storage module 216. For example, the application might maintain contacts, calendar items, and so on, using one or more data formats that are proprietary or used primarily by the application 214 or similar applications. A data format or formats used by the application may be considered in some cases to comprise the "native format" or "native formats" of the data. Regardless of the data formats used, however, the items themselves may be maintained by the application 214 using storage other than the storage that is accessible, for example, through the storage module 216. The storage module may in some cases store the same or similar information using same native format or formats, as well as using one or more other formats, including common formats that may be general to a variety of applications, platforms, operating systems, and so on. In some implementations, the sharing module may translate between these formats as part of, for example, generating a feed and item data.

A sharing relationship between two endpoints might be associated with information—some of which may be referred to as "relationship metadata," like the relationship metadata 262 associated with relationship 1 260. In some implementations, this relationship metadata may include information such as a descriptive name, the creator of the relationship, whether the relationship is two-way (synchronize both endpoints) or publish-only, some type of identification of the data to be shared as part of the relationship, and some type of identification of a data store where some or all of the relationship metadata, feeds, and item data might be stored.

The identification of the data to be shared may be provided or specified in a variety of ways. For example, the identification of the data to be shared might comprise one or more unique identifiers that refer to specific data items, such as specific contacts, calendar items, emails, other data items, and so on. In the same or other implementations, the identification of the data to be shared might consist of one or more categories or tags that refer to a set of data. This might include heterogeneous data where a particular category or tag refers to multiple types of data. For example, a user might create a sharing relationship that includes data items, including, say, both contacts and calendar items (or other types of items), that are all members of a category called "My Shared Information." In the same or yet other implementations, the identification of the data to be shared might consist of a data query statement—like a SQL statement, for example—that identifies the data to be shared. In other implementations the identification of data may include any or all of the previous examples or any other mechanism by which data to be shared may be identified.

In some cases, like when something like categories or tags are used to identify data to be shared, it may be useful to also have some kind of mechanism to map between the different categories used or defined by different endpoints or users. For example, one user named, say, John, might create a sharing relationship and define the data to be shared by specifying a category with the name "My Friends." John might then mark contacts with the category "My Friends," after which they would be shared. The other user that is part of this sharing relationship might want the data that is shared to be marked with the category "John's Friends." To accomplish this, a mapping operation might, for example, map contacts originating from John to this new category before creating such contacts on the subscribing endpoint. A similar type of mapping step may be implemented when items are identified using other types of mechanisms, like unique identifiers, and so on.

Among many different mechanisms and ways to represent relationship metadata, one might use an XML file something like the following:

```
<?xml version="1.0"?>
<Relationship xmlns:xsi="http://www.w3.org/2001/XMLSchema-instance"
        xmlns:xsd="http://www.w3.org/2001/XMLSchema">
    <Version>1.0</Version>
    <ActionType>Synchronize</ActionType>
    <SharingItem>Contacts</SharingItem>
    <StoreType>FILESYSTEM</StoreType>
    <category>
```

-continued

```
        <selType>SelectedCategories</selType>
        <selections>
            <string>My Friends</string>
        </selections>
    </category>
    <calendar>
        <fullCal>true</fullCal>
        <includeLocation>false</includeLocation>
        <startTime>0001-01-01T00:00:00</startTime>
    </calendar>
    <name>My Friends Sharing Relationship</name>
    <creator>johndoe@microsoft.com</creator>
</Relationship>
```

Relationship metadata may be stored or accessed in any fashion, as long as the metadata provides information needed by the sharing module to implement the sharing of items. For example, it may be stored by itself as an XML file, perhaps as shown above. In the same or other implementations, it may be stored with other data. For example, the relationship metadata associated with a sharing relationship may be stored within a feed associated with the same sharing relationship.

After information about the relationship is specified, for example, the sharing module may make available a feed that references the data to be shared. When endpoint A 210 shares data, such a feed might be part of the endpoint A data 264. In addition to the description here, some additional examples of how executable operations associated with the sharing module might be implemented are described in more detail below, for example with reference to FIG. 3, FIG. 4, FIG. 5, FIG. 6, and so on.

In one implementation, for example, a feed that is part of the endpoint A 264 data might contain a reference to all contacts and calendar items that have a particular specified category. If the feed uses RSS, the feed itself might be embodied in an XML file that contains RSS elements, as well as perhaps other elements useful for the sharing of items between multiple endpoints, such as elements associated with SSE. In some implementations, each shared contact or calendar item might be associated with an "item" element in the RSS feed, and each item element might contain as a child an "enclosure" element that references data that actually contains information about the contact or calendar item, while in other implementations the data to be shared may be represented, for example, inline in the feed, perhaps as child elements or data beneath instances of the "item" element. Such additional data might also be part of the endpoint A data 264, along with the feed. In the case of a contact, the "enclosure" element might reference a piece of data in a format like vCard; in the case of a calendar item, the "enclosure" element might reference a piece of data in a format like iCal; and so on. An "enclosure" element, or the like, might reference data in any number of different formats including, for example, other calendar formats, other contact formats, a variety of email formats, and so on.

After the feed is created, it may be dynamically updated by the sharing module whenever items associated with the relationship change. For example, if a user uses a PIM application to update a contact that is part of a sharing relationship, the sharing module may update the feed, including creating or modifying the appropriate SSE or other similar type of data structures, as well as updating the data associated with the contact by, for example, modifying the referenced enclosure, which might be a file in vCard format. Subscribers to the feed may then, at some point, note that the feed has changed and use the feed to update their own data.

Data might be represented in a feed in a wide variety of ways, including the following exemplary XML representation of a feed:

```xml
<?xml version,"1.0"?>
<rss xmlns:sseai="http://www.microsoft.com/schemas/office/outlook/sseaddin"
            xmlns:sx="http://www.microsoft.com/schemas/rss/sse"
            version="2.0">
    <channel>
        <title>Outlook Item Sharing Feed (TwoWay)</title>
                <link>\\computername\share\Actual\TwoWay\johndoe@microsoft
                .com_JOHNCOMPUTER \feed.xml</link>
        <description>Outlook Item Share - Partial Items Feed</description>
        <pubDate>Wed, 02 Aug 2006 22:20:52 GMT</pubDate>
        <lastBuildDate>Wed, 02 Aug 2006 22:22:07 GMT</lastBuildDate>
        <category domain="Microsoft Outlook">VIP</category>
        <sx:sharing since="Wed, 02 Aug 2006 22:20:52 GMT" until="Wed, 02 Aug 2006
                22:22:07 GMT" version="0.92" window="0">
            <sx:related
                link="\\computername\SSEAddIn\Actual\TwoWay\johndoe@micr
                osoft.com_JOHNCOMPUTER\feedall.xml" title="All Items feed"
                type="complete" since="Wed, 02 Aug 2006 22:22:07 GMT" />
        </sx: sharing>
        <item>
            <title>Shared Contact</title>
            <author>Paul Doe</author>
            <category domain="Microsoft Outlook">My Friends</category>
            <enclosure url="03bdb171-0cb4-43ad-a154-5c941476cd22-1.vcf" length="293"
                type="text/x-vCard" />
            <description>Contact Information for Paul Doe</description>
            <pubDate>Wed, 02 Aug 2006 22:22:07 GMT</pubDate>
                <guid>000000000ED82354E10AAD44880632BC0131CA260700
                0C682B70CE37BC4EADED9D375809768A00000D3B26500000
                C9CE5D6369A58F4EAD508F78D1C308D10000043042080000/1
                </guid>
            <sx:sync id="03bdb171-0cb4-43ad-a154-5c941476cd22" version="1"
                deleted="false" conflict="false">
                <sx:history when="Wed, 02 Aug 2006 22:22:07 GMT"
                    by="johndoe@microsoft.com" />
            </sx:sync>
        </item>
        <sseai:OutlookSSEAddInFeedProperties>
            <sseai:Relationship>
                <sseai:Version>1.0</sseai:Version>
                <sseai:ActionType>Synchronize</sseai:ActionType>
                <sseai:SharingItem>Contacts</sseai:SharingItem>
                <sseai:StoreType>FILESYSTEM</sseai:StoreType>
                <sseai:category>
                    <sseai:selType>SelectedCategories</sseai:selType>
                    <sseai:selections>
                        <sseai:string>My Friends</sseai:string>
                    </sseai:selections>
                </sseai:category>
                <sseai:calendar>
                    <sseai:fullCal>true</sseai: fullCal>
                    <sseai:includeLocation>false</sseai:includeLocation>
                    <sseai:startTime>0001-01-T00:00:00</sseai:startTime>
                </sseai:calendar>
                <sseai:name>TwoWay</sseai:name>
                <sseai:creator>johndoe@microsoft.com</sseai:creator>
            </sseai:Relationship>
        </sseai:OutlookSSEAddInFeedProperties>
    </channel>
</rss>
```

The storage module 216 itself might be implemented in variety of ways. For example, in some implementations, the data accessed or stored by the storage module might be represented using a variety of formats, types of stores, locations, and so on. Regardless of how the storage module stores or accesses the data with which it is concerned, it may provide data to the sharing module 212 in a consistent manner so the sharing module can be unaware of the details of how the storage provider is implemented or performs its functions. As just one example, the storage provider might provide the sharing module with a view of the data that consists of, among other things, folders and files. The relationship metadata, like relationship metadata 262, might be made available as a file, even if it is actually stored or accessed by the storage module in a different fashion. In the same or other implementations, each set of data provided by a particular endpoint, like endpoint A data 264 and endpoint B data 266, might be made available to the sharing module in its own folder, even if no actual folder exists as far as the storage module is concerned. Inside each folder, then, the storage module might make the feed and any item data visible as files, even if no such files actually exist.

A variety of "storage providers" may be used as part of the implementation of a storage module. It may be possible to add new storage providers, remove storage providers, and change the implementation of storage providers, and the like, without modifying how the sharing module uses the storage module.

In more detail, the storage provider might provide high-level abstractions to the sharing module for feeds, folders (to contain different feeds), and so on. Such abstractions may be the same regardless of how the data is actually stored. Different implementations of storage providers may then be provided to enable the use of different types of storage. For example, the data may actually be stored using folders in a filesystem, perhaps using a filesystem storage provider like filesystem provider 220. Such a filesystem storage provider might access files stored locally and files stored remotely—like on a network drive or storage system, and so on. In some implementations, files and folders stored either locally or remotely may themselves be synchronized through some other mechanism that keeps files and folders in sync between different computing devices. As a filesystem has concepts like files and folders, the mapping between the storage abstractions provided to the sharing module executable code—which may also contain files and folders—may be minimal in at least some areas. Another storage provider may store the data using a server, like a WebDAV server perhaps accessed using a provider like the DAV provider 222, but again still provide the same abstractions to the sharing module executable code. Yet another storage provider might store data in tables in a database—which may not have any notion of files or a hierarchical relationship between folders—but the storage provider may create the file/item and folder abstractions using data in one or more databases. Such a provider might be represented by the other provider 226. The storage module 216 might use or have available any number of providers that access and store data in a variety of fashions.

In some implementations, the storage provider might use any of a variety of services, each accessible through some type of storage provider. One of these services, perhaps called an "SSE Service," might be a service that exists on one or more machines accessible by a network and may be used by clients for SSE or other synchronization operations or tasks. Such a service might be accessed through, for example, an SSE Service provider 224. For example, such a service might provide the ability for endpoints to upload feeds that are then made available to other endpoints. In such an environment, the different endpoints may only need to subscribe to a feed provided by an SSE Service or otherwise interact with an SSE Service, rather than need to subscribe to multiple feeds provided by multiple different endpoints. In some implementations, an SSE Service might include implementations of SSE synchronization logic—such as the logic, for example, described in more detail with reference to FIG. 3, FIG. 4, FIG. 5, FIG. 6, and so on—so that it can accept modifications from a variety of clients, resolve the modifications to a single feed, and make that single feed available to multiple clients. In other implementations, an SSE Service might just be used to store data and may not implement any type of synchronization logic. In such a case, the endpoints using the SSE Service for data storage may need to implement executable operations like SSE synchronization logic on their own, in the same way that they may need to do so when using at least some other storage providers that provide only storage of data and do not provide any implementation synchronization logic.

In addition to abstractions like items, files, and folders, the storage abstraction may also provide for the notion of "watchers," which are similar to callbacks from the storage module to the sharing module that occur when data associated with a relationship has changed or the sharing module may want to be notified for some reason. For example, a watcher may provide the sharing module with a callback to notify it when data that is associated with a feed or sharing relationship has changed. In one example, a user may have subscribed to a feed provided by another user so that any changes made by the other user are reflected in that user's data. When the other user updates a contact, for example, the feed provided by the other user may be updated with the new contact information. In one specific implementation using a filesystem storage provider, for example, the storage provider may use some kind of a filesystem watcher associated with a particular file that contains the feed data. When the watched file changes, the filesystem storage provider may be notified, for example, by the operating system through the use of the filesystem watcher, and may then in turn notify the sharing module that the feed has changed or that particular items in the feed have changed. The sharing module may then take some appropriate action. If a feed has changed, one such action might include merging any modifications in the changed feed with the data managed by the endpoint, like endpoint A 210, and associated with the application, like the application 214.

Some types of storage, like storage accessible through a DAV provider like the DAV provider 222, may not natively support the notion of watchers or of being notified when a file or other item has changed. In such a case, the storage abstraction and particular storage provider may implement watchers through other means. For example, the DAV provider 222 might periodically poll a DAV server to determine if any relevant files have changed. When a relevant file or files have changed, the DAV provider might then call back to the sharing module in the same way that a filesystem storage provider calls back to the sharing module when an operating system file watcher notifies it that a file has changed.

Exemplary endpoint B 240 is also illustrated as being associated with a sharing module 242, an application 244, and a storage module 246. In some implementations, the sharing module 242, application 244, and storage module 246 may be similar to or the same as the sharing module 212, application 214, and storage module 216 associated with endpoint A 210. In other implementations, any or all of the sharing module 242, application 244, and storage module 246 may be different. For example, the application 244 might be a different application—if application 214 is Microsoft Outlook, for example, then application 244 might be a web browser accessing PIM data through a Windows Live service, or might be any other PIM application or other type of application. Even when the applications are different, they may still be able to share information through the use of sharing modules, as long as the sharing modules know how to interact with the applications to access the data associated with the applications, and also understand the format or formats used to share data. For example, sharing module 212 might interact with a Microsoft Outlook application while sharing module 242 might interact with another application that stores information in some other fashion. Both sharing module 212 and sharing module 242 might be configured to access data through their respective storage modules, and to understand data and items provided by the storage modules. For example, both sharing modules might understand RSS feeds with SSE extensions, and contact and calendar data stored using the vCard and iCal formats.

Endpoint N 280 might represent one of many other possible endpoints that might be involved in one or more sharing relationships including the relationship N 270. In some implementations, although not shown, relationship N 270 might be associated with similar types of information as the information associated with relationship 1 260. This includes relationship metadata associated with relationship N, and endpoint data associated with, for example endpoint A 210 and endpoint N 280.

Endpoint N 280 might in some implementations have elements that are the same as or similar to the elements associated with endpoint A 210 and endpoint B 240, like a sharing module, and so on. In other implementations, endpoint N might have only some, or even none, of the elements associated with endpoint A and endpoint B. For example, endpoint N might be associated with executable code that can access and use the data represented by relationship N 270, but might access the data directly, for example, instead of through the use of a storage module. Regardless of the implementation of endpoint N 280, it may still be a part of one or more sharing relationships if it can use the data associated with those relationships.

Figure 3:
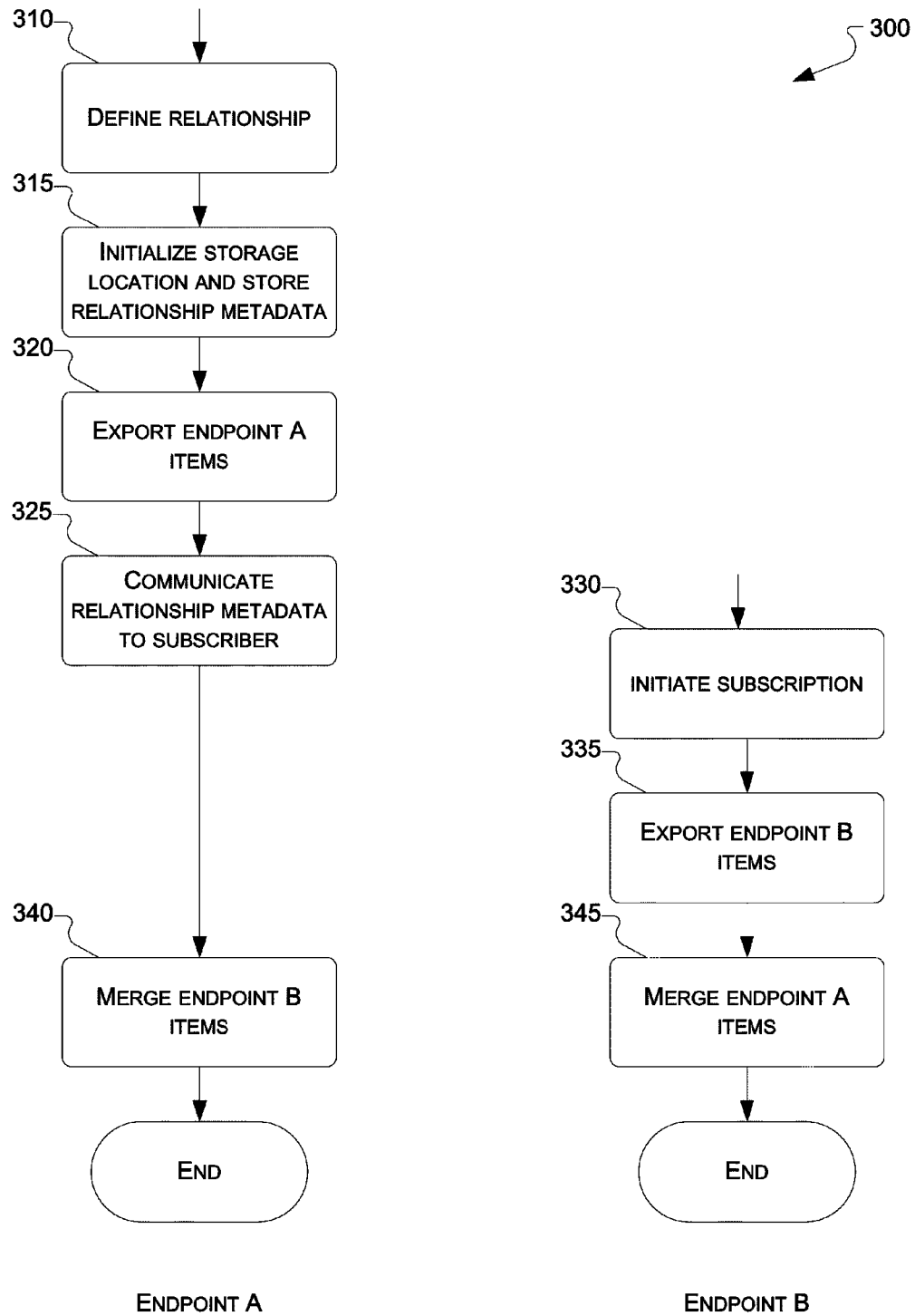
FIG. 3 illustrates an exemplary generalized operational flow including various operations that might be performed when creating a sharing relationship.

Turning now to FIG. 3, shown therein is an exemplary generalized operational flow 300 including various operations that might be performed when creating a sharing relationship. The following description of FIG. 3 may be made with reference to other figures. However, it should be understood that the operational flow described with reference to FIG. 3 is not intended to be limited to being used with the elements described with reference to these other figures. In addition, while the exemplary operational flow of FIG. 3 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

The operations of the operational flow 300 are shown in one of two columns. The operations shown in the left column—operation 310, operation 315, operation 320, operation 325, and operation 340—may be performed on an exemplary endpoint A. In this example, exemplary endpoint A may be the endpoint that creates the sharing relationship. In this example, endpoint A may also be the endpoint that initially publishes data to be shared. The operations shown in the right column—operation 330, operation 335, and operation 345—may be performed on an exemplary endpoint B. In some implementations, the exemplary endpoint A and endpoint B may be similar to or the same as the endpoint A 210, endpoint B 240, or endpoint N 280 described previously with reference to FIG. 2. In other implementations, one or more of the exemplary endpoints described with reference to FIG. 3 may be different. In some implementations, specific users—perhaps called user A and user B—might be associated, respectively, with endpoint A and endpoint B.

In at least one implementation of operation 310, at least some characteristics of the relationship may be defined. These characteristics may include data that might be the same as or similar to the relationship metadata previously introduced, for example, with reference to FIG. 2. For example, some of the data that might be defined might include a descriptive name for the relationship, the creator of the relationship, whether the relationship is two-way (synchronize both endpoints) or publish-only, some type of identification of the data to be shared as part of the relationship, and some type of data store where some or all of the relationship metadata, feeds, and item data might be stored. As described previously, the identification of the data to be shared might be provided in a variety of ways, including using identifiers of specific items, tags or categories that encompass various items, data queries, and so on. Similarly, as already described, the type of store might include a filesystem location, one or more of a variety of networked servers, and so on.

The relationship metadata defined in operation 310 might be provided in a variety of ways. In some implementations, one or more user interface elements or screens might exist that enable a user to provide the necessary data. In the same or other implementations this data might be read from one or more configuration files, and so on. At least some of the relationship data might be generated automatically or without explicit user action—for example, the time the relationship was created might be set using a system clock, the creator of the relationship might be inferred through operating system functionality that provides the name of the current user, and so on.

In an exemplary instance of operation of 315, the relationship data provided in operation 310 may be used to initialize or create the storage location to be used to store possibly both the relationship metadata and item data. The specific mechanisms and operations performed to implement operation 315 may vary depending, among other things, on the type of storage location and the way in which the relationship metadata is stored. In some implementations that use some type of storage abstraction, including the storage provider previously described with reference to FIG. 2, the actual implementation of much or all of operation 315 may exist in a storage provider that interacts with the storage location. In other implementations, the storage location may be accessed directly.

For example, suppose user A provided a filesystem location—like a folder on networked drive—in operation 310. As a result, in one implementation of operation 315 a filesystem storage provider might create a file in the specified folder that contains an XML representation of the relationship metadata provided and defined in operation 310. Any other storage initialization required by a particular type of storage might also be performed.

In one example of operation 320, the items associated with the relationship—as defined, perhaps, as part of operation 310—may be exported in some fashion, to generate a feed. For example, in an implementation that uses RSS feeds extended using SSE and with enclosures, as described previously with reference to FIG. 2, an implementation of operation 320 might involve generating an RSS feed document that contains any necessary item and SSE information, and generating one or more enclosure files that contain item data. Any such generated feed and other data might be stored in some form using the storage location initialized previously in operation 315. For example, this operation, or operation 315, may create a folder into which any generated feeds and other data may be placed. The generated feed may have many representations, including the representations described herein, including those described below, with reference to, for example, FIG. 7.

In one implementation of operation 325, at least some of the relationship metadata may be communicated in some fashion to another user or endpoint. For example, in some examples, at least part of this operation might involve communicating some type of identifier for the relationship or storage location to another user, so that the other user has information they need to subscribe to the feed created previously. For example, in the example where the storage location is a particular folder on a networked drive, at least part of the information communicated in this operation might be location on the network of the networked drive and the folder stored by the networked drive. Using the communicated location in a subsequent operation, the user associated with endpoint B might then have the ability to access the feed.

Whatever the necessary data, it may be communicated in a wide variety of ways. For example, in one implementation, user A might call user B using a telephone and tell them the information needed for a subscription. In another implementation, executable code associated with endpoint A might automatically create and send an email or some other type of electronic communication to the user associated with endpoint B. In an implementation where part of the information obtained during an operation like the define relationship operation 310 includes names, email addresses, or other identifying information associated with potential subscribers, an implementation of operation 325 may be able to communicate the necessary connection information to endpoint B or a user associated with endpoint B, without any further input on the part of endpoint A.

In one implementation of operation 330, whatever steps required to initiate a subscription to the item data provided by endpoint A may be taken on endpoint B. At least some of the specific steps taken may be influenced by, among other things, the nature of the storage location, and/or the information communicated in operation 325 and the fashion in which the information was communicated in operation 325. For example, in the previously described example where a filesystem location on a networked drive was communicated to the user associated with endpoint B via a telephone call or an email message, user B might use one or more user interface elements or screens to specify that they want to subscribe to a feed, and provide the communicated network address. In another implementation, including one where, for example, the information transmitted as part of operation 325 used an email message or some other type of electronic message, the executable code associated with endpoint B might automatically intercept the communication. The executable code may then also prompt user B to determine if the user wants to subscribe to the provided feed, and may automatically perform any additional required initialization operations if the user answers the prompt affirmatively. In the same or other implementations, a subscription may be created automatically without requiring any user intervention, at least in some cases. The specific steps taken as part of a subscription may vary depending on, among other things, the type of subscription and storage location used.

In one implementation of operation 335, endpoint B may generate a feed by exporting the items defined by the relationship in some fashion. In some implementations this operation may be similar to operation 320 where the items are exported by endpoint A. For example, in the case where the items are shared using an RSS feed document that contains any necessary item and SSE information and one or more enclosure files that contain item data, this operation might generate such a feed document and item data. Any such generated feed and other data might be stored in some form using the storage location initialized previously in operation 315, or perhaps in some other location. For example, this operation may create a folder into which any generated feed and other data may be placed. In some cases, like when the storage location used is a networked drive, this operation might also create a new folder to contain the exported feed and other data.

In implementations of operation 340 and operation 345, both endpoints may perform a merge operation using the exported feeds and possibly other data. Such merge operations might serve to incorporate changes made by the other endpoint into the data maintained by each endpoint. That is, endpoint A might merge the data exported by endpoint B and endpoint B might merge the data exported by endpoint A. The implementation of such merge operations may take multiple forms, including, at least in some implementations, the merge operation explained in more detail below with reference to FIG. 10.

Note that while the operations of the operational flow 300 involve publishing data from both endpoints and merging changes from both endpoints, this is not required. For example, if endpoint A wants to share items but does not want to incorporate any changes to those items made by another endpoint or endpoints, the same or similar operations may be performed, but, in one implementation, operations such as operation 335 and operation 340 may not be performed.

Figure 4:
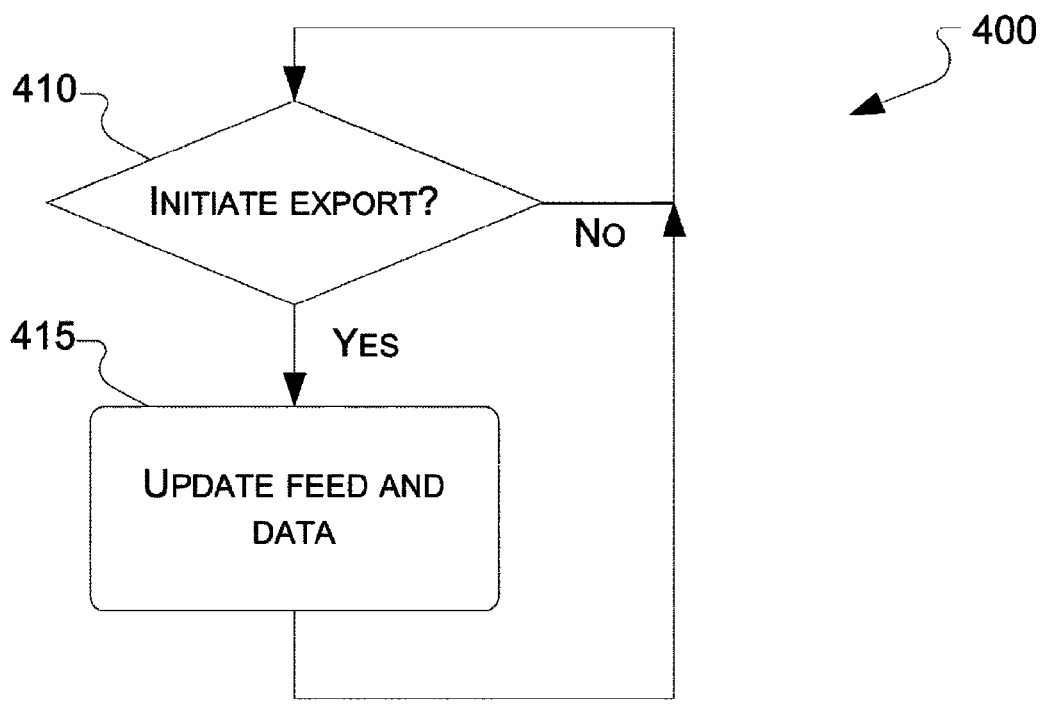
FIG. 4 illustrates an exemplary generalized operational flow including various operations that may be performed when updating data associated with an endpoint.

Turning now to FIG. 4, shown therein is an exemplary generalized operational flow 400 including various operations that may be performed when updating data, including the feed, associated with an endpoint. The following description of FIG. 4 may be made with reference to other figures. However, it should be understood that the operational flow described with reference to FIG. 4 is not intended to be limited to being used with the elements described with reference to these other figures. In addition, while the exemplary operational flow of FIG. 4 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 410, it may be determined if the items associated with a particular sharing relationship, or relationships, should be exported. This determination may be made in a variety of ways. For example, in some implementations an application that stores item data, like a PIM application in some cases, may provide a callback or other notification that is accessible to the operation 410 when an item maintained by the application changes. In the same or other implementations, such a notification might be received when a new item is created. In some implementations the notification may be generated only for items that might initiate an export, while in other implementations the notification might be generated for all items and the operation 410 or associated executable code may filter the notifications and only act on notifications that are relevant. For example, it may only act on notifications that are associated with items that are part of a sharing relationship and so might initiate an export operation.

When such a notification is received, the operation 410 may determine that it is necessary initiate the export of item data so that the feed and any other data can be kept in sync with the state of the items as maintained by the application. In the same or other implementations, a threshold of changes may be required before initiating an export. That is, an export may only be initiated when, say, three, five, or some other number of changes have occurred. In the same or other implementations, particular items—perhaps those items associated with a "high priority" in some fashion—may result in the initiation of an export immediately while other particular items only result in the initiation of an export after some number of changes have occurred, or some amount of time has elapsed.

In other implementations, the operation 410 or some executable code associated with the operation 410 may "poll" or otherwise examine the items to determine if there have been any changes and may initiate an export when any change, or some particular set of changes, have occurred. In other implementations, an export may be initiated when a particular amount of time since the last export has passed. In some cases some type of external event—including, for example, a specific user action or request—may initiate an export.

If no export is determined to be necessary at operation 410, in one implementation the operational flow 400 proceeds to execute operation 410 again as shown, repeatedly, so that any subsequent changes that necessitate an export of item data are detected. In these or other implementations, there may be a variety of intervals of time, for example, that elapse before the operation 410 is evaluated again. In other implementations, the execution of operation 410 may be contingent on a variety of other actions or triggers including, for example, some of the actions described previously, including the modification of a file, a callback, and so on.

In one implementation of operation 415, a feed (or all feeds) and any associated data may be updated. As a result, the information exposed by this endpoint may be brought into sync with the items as maintained by the application.

While the specific implementation of operation 415 may vary, in general the implementation may involve examining the data associated with the items associated with the sharing relationship and updating the feed and any related data like referenced enclosures so that the feed and data are updated to include any changes in the shared items. As one example, in an implementation that uses SSE, this operation may include updating or generating a new RSS feed, including any required SSE information or changes, and updating or generating any referenced enclosures.

In implementations that use SSE, some of the operations that might ultimately initiate an export and result in the execution of the operation 415 include the creation of a new item, which might result in the execution of (or might have already resulted in the execution of), for example, some or all of the steps described below with reference to FIG. 8, or the update or modification of an existing item which might result in the execution of (or might have already resulted in the execution of), for example, some or all of the steps described below with reference to FIG. 9.

In some implementations, the operation 415 may also include specific additional steps related to copying, publishing, or otherwise making the newly updated feed and data accessible while in other implementations these additional steps may not be necessary. For example, if a feed and data are stored on a DAV server, the operation 415 may include copying the newly updated feed and data to the DAV server after it is generated in some other location. If the feed and data are stored on a filesystem location, this additional copy step may or may not be needed, depending, for example, on where the feed and data are placed when they are generated.

When the operation 415 has completed, in some implementations the operational flow 400 may continue to operation 410 so that subsequent actions or events that might trigger another export may be detected, as shown. In other implementations, the operational flow 400 may be complete after an execution of the operation 415, or after the operation 415 has been executed some number of times, for example.

It should be noted that in some implementations, the operational flow 400 may be executed once for all relationships, feeds, and so on, and as such its operations may operate on all relationships. That is, for example, an implementation of operation 410 may choose to initiate an export for any relationship, and an implementation of operation 415 may update the feed and data for any or all relationships. In other implementations, the operational flow 400 may be executed separately for each relationship.

Figure 5:
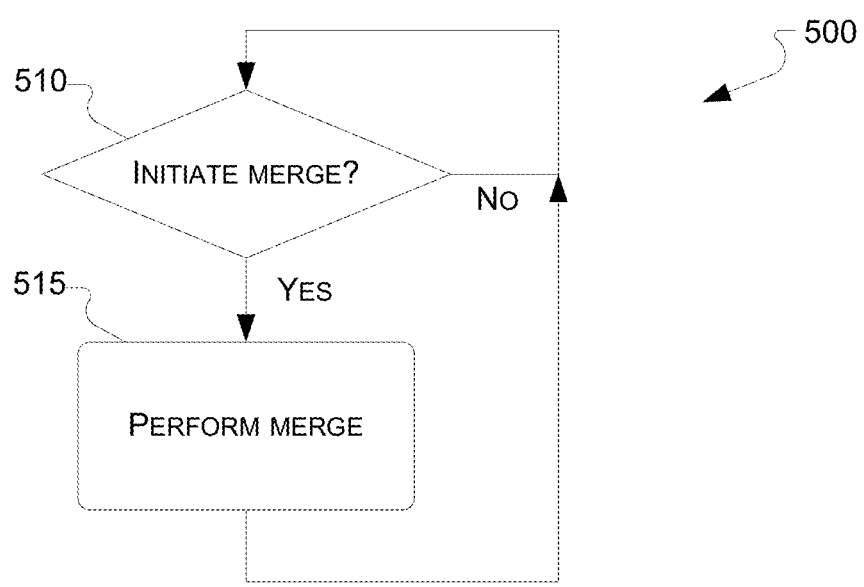
FIG. 5 illustrates an exemplary generalized operational flow including various operations that may be performed when merging data from another endpoint with the data associated with items maintained locally.

Turning now to FIG. 5, shown therein is an exemplary generalized operational flow 500 including various operations that may be performed when merging data from another endpoint with the data associated with the items maintained locally. The following description of FIG. 5 may be made with reference to other figures. However, it should be understood that the operational flow described with reference to FIG. 5 is not intended to be limited to being used with the elements described with reference to these other figures. In addition, while the exemplary operational flow of FIG. 5 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In one implementation of operation 510, it is determined if a merge should be performed. This determination may be made in a variety of ways. For example, in some implementations some type of "watcher"—such as a filesystem watcher or the like, as described previously—may provide a callback or notification that is accessible to the operation 510 when a feed associated with an endpoint that is part of a sharing relationship with this endpoint has changed. For example, suppose the operation 510 is being executed by endpoint A, and endpoint A has a sharing relationship with endpoint B. In some implementations, a watcher may provide a notification when a feed provided by endpoint B has changed.

In the same or other implementations, the operation 510 may poll or otherwise examine the data exposed by other endpoints and may initiate a merge, for example, when such data has changed.

In some implementations, a merge may be initiated whenever data associated with another endpoint has changed. In other implementations a merge may not be initiated with every change. For example, in some cases a merge may only be initiated after some number of changes have occurred, after a change has occurred and a particular amount of time has elapsed, and so on. In addition, in some implementations, sometimes a merge may be initiated after a particular amount of time has elapsed, even if no changes have occurred. In some cases some type of external event—including, for example, a specific user action or request—may initiate a merge.

If it is not deemed necessary to initiate a merge in the operation 510, in one implementation the operational flow 500 proceeds to execute operation 510 again as shown, repeatedly, so that any subsequent changes that necessitate the initiation of a merge are detected. In these or other implementations, there may be a variety of intervals of time, for example, that elapse before the operation 510 is evaluated again. In other implementations, the execution of operation 510 may be contingent on a variety of other actions or triggers including, for example, some of the actions described previously, including the modification of a file, a callback from a function, and so on.

In one implementation of operation 515, a merge is performed and, as a result, the local items maintained by the endpoint performing the merge may be updated to reflect changes made by an external endpoint that has a sharing relationship with the endpoint performing the merge.

While a merge operation may be implemented in a variety of ways, in general it may involve examining data provided by another endpoint's feed (and any other related data), and updating or creating any associated items maintained locally. For example, in an implementation that uses SSE and RSS feeds, and that shares PIM data like contacts, an implementation of a merge may involve examining the RSS feed provided by another endpoint and updating the contacts (and possibly other data) maintained by the PIM application. For example, when the RSS feed includes a new contact, or other type of data item, that does not exist in the data maintained by the PIM application, the merge operation may create this new contact. Similarly, when the RSS feed includes changes to an existing contact, or other type of data item, that are not reflected in that contact or data item maintained by the PIM application, the merge operation may update the contact or data item.

As part of the merge operation, a variety of additional operations may be performed including, for example, the detection of potentially conflicting changes, and the preservation of data when changes potentially conflict with each other.

In some implementations, including those that use SSE, a merge operation may involve the execution of, for example, some or all operations described below with respect to FIG. 10, and other figures. In other implementations, a merge operation may involve the execution of other operations.

When operation 515 has completed, in some implementations the operational flow 500 may continue to operation 510 so that subsequent actions or events that might trigger the initiation of another merge may be detected, as shown. In other implementations, the operational flow 500 may be complete after an execution of the operation 515, or after the operation 515 has been executed some number of times, for example.

It should be noted that in some implementations, a merge operation may only be performed for the data associated with a single particular relationship while in other implementations a merge operation may include merging data for all or multiple relationships.

Figure 6:
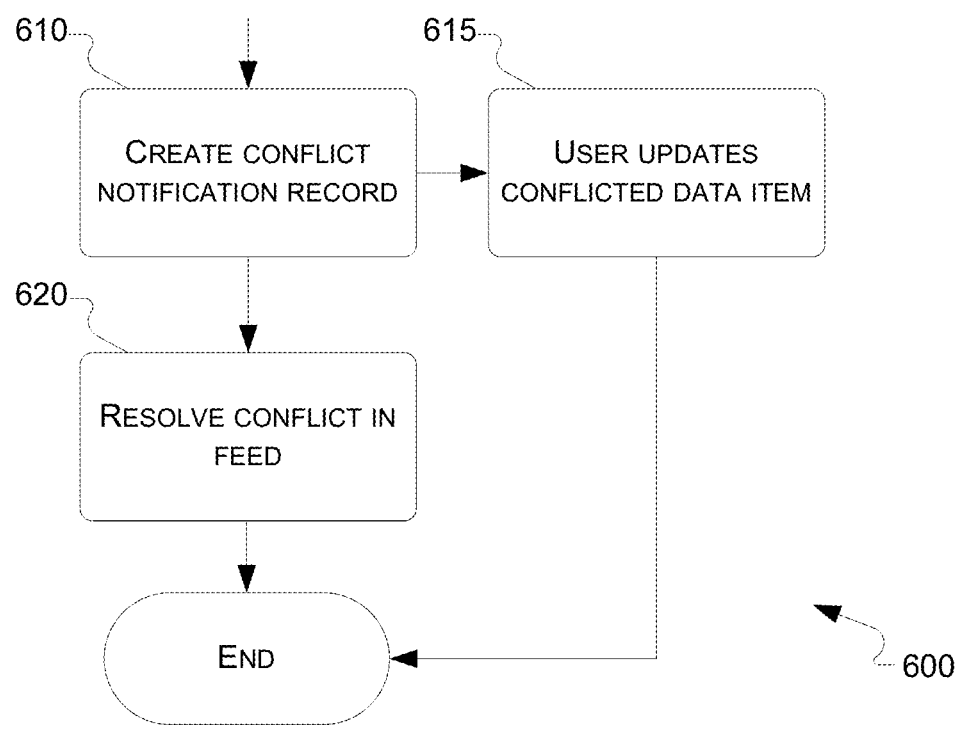
FIG. 6 illustrates an exemplary generalized operational flow including various operations that may be performed as part of the resolution of conflicts.

Turning now to FIG. 6, shown therein is an exemplary generalized operational flow 600 including various operations that may be performed as part of the resolution of conflicts. The following description of FIG. 6 may be made with reference to other figures. However, it should be understood that the operational flow described with reference to FIG. 6 is not intended to be limited to being used with the elements described with reference to these other figures. In addition, while the exemplary operational flow of FIG. 6 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

Through a variety of operations executed as part of the sharing of items, one or more conflicts may be found. In some implementations, for example, a conflict might be defined as occurring when two endpoints have changed a particular item without knowledge of the change made by the other endpoint. For example, if endpoint A updates a contact and endpoint B updates the same contact without first incorporating the change made by endpoint A, the contact may be determined to be in conflict, or the changes made by endpoint A and endpoint B may be determined to be conflicting changes.

In some implementations, conflicts may be found during, for example, a merge operation, including the merge operation described previously with reference to FIG. 5, and described in more detail below with reference to, for example, FIG. 10, FIG. 11, and FIG. 12. During a merge operation, as described, conflicts may be detected and noted through a variety of means. For example, in an implementation that uses SSE and RSS and performs a merge operation using some or all of the steps described below with reference to FIG. 10 and FIG. 12, a conflict may be detected when the same item has been modified by independently by both endpoints involved in the merge operation. As a result, in some implementations an indication of the conflict, perhaps including a conflict element, may be created in the resulting feed, as described below with reference to, for example, operation 1045 of FIG. 10 and operation 1210 and operation 1215 of FIG. 12.

Figure 10:
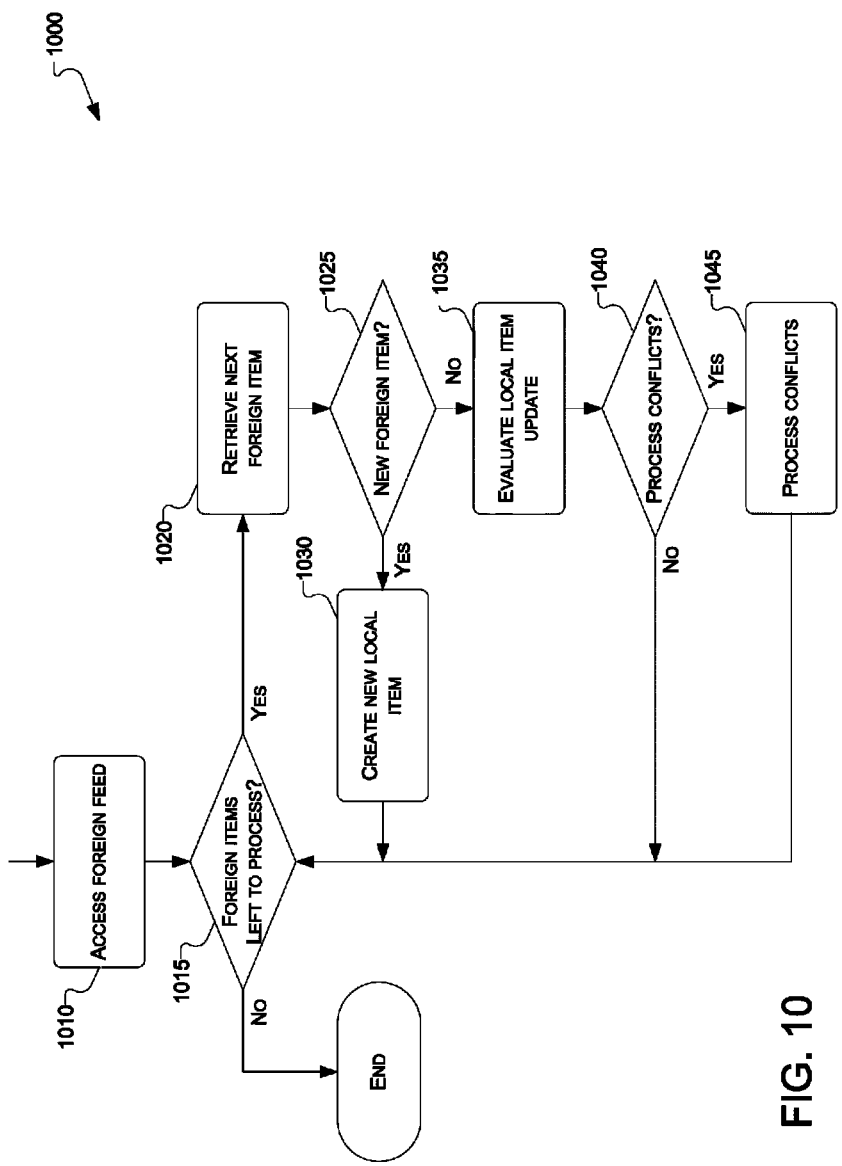
FIG. 10 illustrates an exemplary generalized operational flow that includes various operations that might be performed when merging changes made by another endpoint with the data maintained by a local implementation of an endpoint.

While a merge operation may result in the identification of one or more conflicts, in general the manner in which such conflicts are resolved may be outside the scope of the processing described, for example, with reference to FIG. 5, FIG. 10, and FIG. 12. That is, while a conflict may be identified during a merge operation, and both sets of changes may be preserved, the ultimate determination of which changes, or which subsequent update(s), resolve, fix, or remove, the conflict may be left to, for example, some other operational flow. One example of such an operational flow may be the operational flow 600.

In general, the operational flow 600 may be executed at some point after the identification of a conflict. In one implementation of operation 610, a conflict notification record is created. Such a record may serve to notify a user or other entity of the existence of a conflict so the user or entity may resolve the conflict as appropriate. In some implementations, the conflict notification record may comprise an email message that includes information about the conflict, including one or both of the two sets of changes that were identified as being in conflict. In more detail, for example, in one implementation a folder associated with the sharing of items may be created in a user's mail store. Whenever a conflict is detected, a message may be created and stored in this folder. The message itself may contain, perhaps as an attachment, a copy of the data item that was determined to be in conflict or the item associated with the conflict. In some cases, the data that was determined to have priority may be used during a merge operation to update the actual data item while the data that was not determined to have priority may be included in the conflict notification record.

In an exemplary implementation of operation 615, a user or other entity may update the actual item that was determined to be in conflict. This may be done in a variety of ways depending on a variety of factors, including the information stored, associated, or referenced by the conflict notification record, and the manner in which the data items are maintained locally. In some implementations, continuing with the example described previously with reference to operation 610, a user may open the conflict notification record and perhaps any attachment, as well as the original item, and manually or through some other means update the data associated with the original item. For example, the user might determine that one of the changes in the conflict notification record should be incorporated into the original item, or that some new data should be used, and may make such a change manually. In some cases, the user or entity may determine that the original item already has the correct information, and no additional changes may be necessary. In some implementations, this operation may be related to and may result in the same type of changes or actions as described below in operation 1310 of FIG. 13.

In one implementation of operation 620, which may in some cases be executed contemporaneously with operation 615 and may in other cases be executed at some other time, the conflict associated with the conflict notification record created in operation 610 may be identified as having been resolved, at least so far as a feed associated with the items is concerned. For example, in some implementations the changes and actions described below in operation 1315 of FIG. 13 may be performed so that the conflict is noted as being resolved in the feed. The conflict may be marked as resolved in the feed even when a user has not updated the conflicted item, including as described previously with reference to the operation 615.

Simple Sharing Extensions

As has been described previously, various operations performed as part of sharing items may be implemented using, among other techniques, one or more extensions to existing feed protocols, including SSE. Some of the following description provides more information about SSE, including exemplary feeds and operations such as additions, modifications, and merges.

Figure 7:
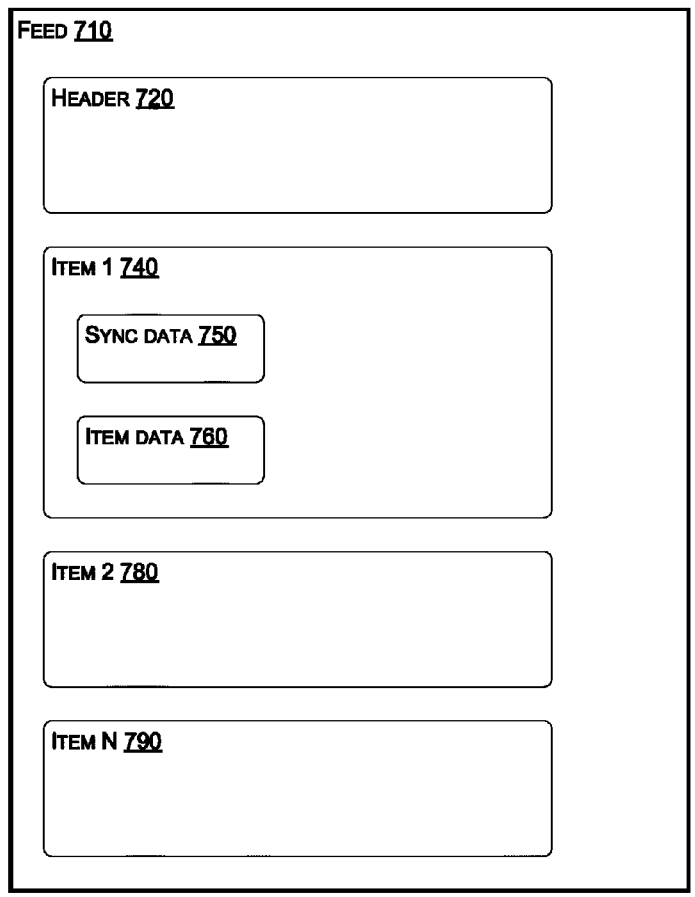
FIG. 7 illustrates an exemplary system that includes a graphical example of a feed.

Turning now to FIG. 7, shown therein is an exemplary system 700 that includes a graphical example of a feed 710. A feed 710 might contain a header 720 as well as some number of items including, in some examples, item 1 740, item 2 780, and item N 790. Each item might contain sync data 750 and item data 760. This description of FIG. 7 may be made with reference to other figures. However, it should be understood that the elements described with reference to FIG. 7 are not intended to be limited to being used with the elements described with reference to other figures. In addition, while the exemplary diagram in FIG. 7 indicates particular elements, in some implementations not all of these elements may exist, and in some implementations additional elements may exist.

A feed may be represented using any of a wide variety of formats. Generally, however, a feed might contain information necessary to communicate item data and sync data, where item data might be data associated with the particular items being shared as part of the feed and sync data might be additional data required or useful for implementing the synchronization of the items. In some implementations, a feed might use a syndication or data sharing format, such as RSS or Atom. In another example, a feed might use a list-processing format, like Outline Processor Markup Language (OPML). In yet another example, a feed might use some other method for sharing data that does not use XML.

Regardless of the format used by the feed, an exemplary feed 710 may in some cases contain a header with header information that may be general to the entire feed, such as the exemplary header 720. In the case where the feed uses RSS, the header 720 might contain some or all of some standard RSS header elements, such as the "rss" element, the "channel" element, the "title" element, the "description" element, and so on.

The header might also contain data, in some cases also represented using XML elements, such as the data described in the following paragraphs. While this data may be described with reference to XML elements, XML attributes, RSS, and so on, the use of XML or RSS is not required. A header, or the entire feed for that matter, may contain some or all of this data and may represent the data in a variety of formats. For example, a header represented using RSS might contain an RSS "channel" element and a "sharing" element beneath the "channel" element. The "sharing" element might in turn contain a number of attributes and sub-elements. However, such a representation—using RSS, XML elements, XML attributes, and so on—is provided for exemplary purposes only. The data represented in such an example may also be represented in any of a wide number of alternate formats.

As just one example, the header 720 might contain information like the following:

```
<channel>
    <sx:sharing since="Tue, 1 Nov 2004 09:43:33 GMT"
        until="Fri, 1 Mar 2005 09:43:33 GMT" version="0.92" >
        <sx:related link="http://x.com/all.xml" type="complete" />
        <sx:related link="http://y.net/B.xml" type="aggregated"
            title="Family Contacts (Dads Copy)" />
        <sx:related link="http://y.net/C.xml" type="aggregated"
            title="Family Contacts (Suzys Copy)" />
    </sx:sharing>
    ...
</channel>
```

In this example, the "channel" element might be the standard RSS "channel" element (other standard RSS header information, like the "title" and "description" elements may exist, and, if so, is not shown). In this example the use of the string "sx:" might indicate a particular XML namespace, perhaps including a namespace related to sharing and synchronizing data as described herein. The use of such an XML namespace prefix may not be required for the sharing of data, except as may be required, for example, by the particular format or formats used to represent the feed. For example, if the feed is represented using XML, one or more namespaces might be used or required.

The header 720 might contain header data like that represented in this example by the "sharing" element including some or all of the "since", "until", and "version" attributes, or the like.

Such data might include a value associated with an attribute like "since", which might represent the date-time from which all items in the feed have been incorporated. In some implementations, a feed might include only the most recent modifications, additions, and deletions within some reasonable time window. In some implementations, these feeds might be referred to as "partial" feeds, whereas feeds containing the complete set of items may be referred to as "complete" feeds. New subscribers to a feed might then initially copy a complete set of items from a publisher before having the ability to process incremental updates. Data like that represented by a "since" attribute might be useful, for example and in addition to other data described herein, as part of an implementation of partial and complete feeds. A partial feed might reference the complete feed, for example, by using one or more links or references in the partial feed. By placing a link to a complete feed, for example, in the channel descriptor, only a reference to the partial feed might need to be distributed to potential subscribers. If such an attribute is not present, the "beginning of time" might be assumed, such that the feed contains the endpoint's complete set of data as of the date-time value represented by the "until" value.

The data might also include a value associated with an attribute like "until", which might represent the last date-time when items were incorporated into the feed. The publisher of the feed might guarantee that the value associated with the "until" attribute will increase if any items in the feed are updated. If this attribute is omitted or blank, the subscriber to the feed might not be able to make assumptions about when the feed was updated.

The data might also include a value associated with an attribute like "version", which might represent the version of a specification—including rules about generating and merging content—that was used when the feed was generated.

In some implementations, the data might also include a value associated with an attribute like "window", which might represent the maximum period of time, in days or some other unit, that might elapse after the value associated with the "until" attribute, before a subscriber is no longer able to synchronize with the feed. Subscribers might use this value to determine the frequency with which they should read a feed, as well as when to read the complete feed in the cases where partial feeds exist. Publishers might use this value for a variety of purposes, including to determine when to remove items from partial feeds, to determine when to actually delete data associated with items that have a "deleted" attribute set to "true", and to determine when to delete items associated with a "resolvedconflicts" element (exemplary "deleted" and "resolvedconflicts" elements are described in more detail below).

In some implementations, one or more pieces of data associated with feeds related to a particular feed might be used. In some cases, like the previously presented example, this data might be represented using one or more "related" elements that are children of a "sharing" element. A "related" element might contain some or all of "link", "title", "type", "since", and "until" attributes, or the like.

Such data might include a value associated with an attribute like "link", which might represent a URL or other reference to a related feed. The data might also include a value associated with an attribute like "title", which might contain a name or description of the related feed.

The data might also include a value associated with an attribute like "type", which might contain as data either "complete" or "aggregated". The value "complete" might be used when the link references a feed that contains a complete set of items associated with the feed. The value "aggregated" might be used when the link references a feed whose contents are being incorporated into this feed by the publisher. In some implementations—for example, in the case where a publisher has aggregated information from other feeds into a larger work—it may be useful for subscribers to see more detailed information about the other feeds. This data might also be used to provide information to subscribing feeds about the feeds of other participants, to which they might also wish to subscribe.

The data might also include a value associated with an attribute like "since", which might represent the starting point of the related feed. If this attribute is omitted or blank, it might be assumed that this is a complete feed. The data might also include a value associated with an attribute like "until", which might represent the ending point of the feed.

In addition to a header 720, an exemplary feed 710 may generally contain one or more item elements, such as item 1 740, item 2 780, and item N 790. Generally, each item element may contain one or both of sync data 750 and item data 760. In an implementation where the feed is provided using RSS, an item, like item 1 740, may be associated with the "item" element defined and used in RSS. (Again, as has been described, feeds may be represented in a wide variety of formats, and are not limited to RSS, XML, or the like.)

When using RSS, as just one example, an item element, like item 1 740, might contain information like the following:

```
<item>
    <sx:sync id="0a7903db47fb0ae8" version="1">
        <sx:history when="Sat, 21 May 2005 09:43:33 GMT"
        by="UserXDeviceY"/>
    </sx:sync>
    <title>This is a test title</title>
    <description>This is a test item description.</description>
</item>
```

Item data 760 may generally comprise information related to the item itself. In the previous example, the item data 760 might include the RSS "title" and "description" elements. In another example, if a feed contains an item for each of a specified set of contacts, the item data 760 might generally contain information about a particular contact's name, address, phone number(s), and so on. The item data information might be represented in any of a wide variety of formats. In the case of contact information, for example, the item information might be represented using the hCard standard, the vCard standard, or any other format that contains contact information. It is noted that the item data may be stored in any format and is not limited to, for example, XML, XHTML, or any other standardized method for representing information.

If a feed is associated with information typically represented in binary form, like audio data or image data, the item data might include such binary information, and so on. The item data may also be stored outside of the feed. In such an implementation, the feed may reference the item data, perhaps using an element like the RSS "enclosure" element.

Sync data 750 generally comprises information associated with the sharing and synchronization of the associated item data. In some implementations this might include data represented, for example, using a "sync" element that might have some or all of the "id", "version", "deleted", and "noconflicts" attributes, or the like, as well as additional attributes. The sync data 750 might also include elements that are, in some implementations, children of a "sync" element, including, for example and without limitation, "history", "update" (which might be a child of a "history" element), "conflicts", and "resolvedconflicts", and the like, as well as additional elements. In some implementations, items that include a valid sync data element 750, or the like, may be considered to be "configured for sharing," in that they may contain information used when sharing the item between multiple endpoints.

Such data might include a value associated with an attribute like "id", which might represent the identifier for the particular item. The value of this attribute may in some implementations be unique within a feed and might also be globally unique across feeds if an item is being shared or synchronized. In some implementations, the value of this attribute might be assigned by the creator of the item, and should not be changed by subsequent publishers.

Such data might also include a value associated with an attribute like "version", which might represent the modification sequence number of the item. In some implementations this value might start at "1" and increment by one indefinitely for each subsequent modification.

Such data might also include a value associated with an attribute like "deleted". Such an attribute, if present and when the associated value is "true", might indicate that the associated item has been deleted and that the remaining data is a "tombstone" useful, for example, to propagate deletions. If this attribute is not present, or if it is present with value of "false", then the item might be considered to not be deleted.

Such data might also include a value associated with an attribute like "noconflicts". Such an attribute, if present and when its associated value is "true", might indicate that particular parts of conflict processing, including perhaps conflict detection and conflict preservation, should not be performed for the associated item. Some possible implementations associated with conflict processing are described below. If this attribute is not present, or if it is present with a value of "false", then it might indicate that conflict processing should be performed for the item.

In addition to attributes that might be used with a "sync" element, or the like, some implementations may maintain the chronological change history for an element, possibly through the use of an element that is a child of the "sync" element, and that might, in some implementations, have the name "history". In some implementations, such an element might have some or all of "when" and "by" attributes, or the like, as well as additional attributes. A "history" element might also, in some implementations, sometimes have one or more "update" elements as children, as well as additional elements. An exemplary "update" element is described in more detail below.

Information associated with a change history might include a value associated with an attribute like "when", which might represent the date-time when the most recent modification of the associated item took place. If this attribute is omitted the value might default to the earliest time that can be represented using, for example, the date format specified by the Internet Engineering Task Force (IETF) RFC 822.

Such data might also include a value associated with an attribute like "by", which might identify the unique endpoint or entity that made the most recent modification. In some implementations, the associated value might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

In some implementations at least one of the "when" or "by" attributes must be present—in such implementations it may be invalid to have neither.

In some implementations, some parts of an item's change history might be maintained through the use of an "update" element, or the like, as part of the item's sync data 760. In some of these implementations, each "update" element might represent a distinct update operation applied to the associated item. In some implementations a new "update" element might be created each time the item is updated.

As just one example, the following XML fragment might indicate that the particular item was modified on May 21, 2005—as is indicated by the "update" element—and then modified again, more recently, on May 23, 2005—as is indicated by the "history" element:

Another set of elements that might be part of an item's sync data 750 might be a conflict collection and a resolved conflict collection, perhaps represented using a "conflicts" element and a "resolvedconflicts" element, or the like. Both of these elements might be used, for example, as part of a conflict preservation implementation. Such an implementation might preserve, for example, the "losing" change when two changes conflict. Some examples of conflict preservation implementations are described below, for example, with reference to FIG. 10, FIG. 11, and FIG. 12.

Figure 8:
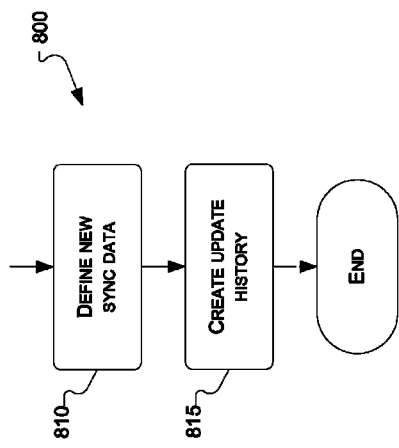
FIG. 8 illustrates an exemplary generalized operational flow including various operations that may be performed when modifying an item to include sharing and synchronization data.

Turning now to FIG. 8, shown therein is an exemplary generalized operational flow 800 including various operations that may be performed when modifying an item to include sharing and synchronization data. The following description of FIG. 8 may be made with reference to other figures. However, it should be understood that the operational flow described with reference to FIG. 8 is not intended to be limited to being used with the elements described with reference to these other figures. In addition, while the exemplary operational flow of FIG. 8 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

The operations described in the exemplary operational flow 800 may generally be performed when an item that has not previously been configured for sharing or synchronization is to be shared. One example of when such operations might be performed is when a new item is created as a result

```
<item>
    <sx:sync id="0a7903db47fb0ae8" version,"1">
        <sx:history when="Mon, 23 May 2005 09:43:33 GMT" by="UserXDeviceY">
            <sx:update when="Sat, 21 May 2005 09:43:33 GMT" by="UserXDeviceY" />
        </sx:history>
    </sx:sync>
    <title>This is a test title</title>
    <description>This is a test item description.</description>
</item>
```

In some implementations, an "update" element might have one or both the "when" and "by" attributes, as well as other attributes.

Such data might include a value associated with an attribute like "when", which might represent the date-time when the modification associated with this update took place. If this attribute is omitted the value might default to the earliest time that can be represented using, for example, the date format specified by IETF RFC 822.

Such data might also include a value associated with an attribute like "by", which might identify the unique endpoint that made the modification associated with this update. In some implementations, the value of this attribute might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

Like with the "history" element, in some implementations, at least one of the "when" or "by" attributes must be present—in such implementations it may be invalid to have neither.

of a local user operation. For example, if a user is synchronizing her contact information and creates a new contact, the operations described with reference to FIG. 8 might be performed so that the contact contains the minimum set of sharing information necessary for the sharing of that contact. Another example of when such operations might be performed might be when a set of items that already exists but that is not configured for synchronization is extended to support sharing and synchronization.

In one example of operation 810, new sync data may be defined. This new sync data might include, for example, a unique identifier and an initial version value. In some cases the initial version value may be a starting version of "1". Further, in implementations that, for example, generate a feed that is represented using XML, this operation might result in the creation of a new "sync" element, or the like, or the definition or creation of data that ultimately results in the creation or generation of a "sync" element when a feed is generated. In such implementations, or in other implementations, the unique identifier data might be associated with an "id" attribute and the version information might be associated with a "version" attribute.

In an exemplary implementation of operation 815, an update history may be created. The newly created update history may contain information about this initial update, perhaps specified using one or both of values that define when the information was defined and by whom the information was defined. In implementations that, for example, generate a feed that is represented using XML, this operation might result in the creation of a new "history" element, or the like, or the definition or creation of data that ultimately results in the generation of a "history" element when a feed is generated. In such implementations, or in other implementations, the time when this information was defined might be associated with a "when" attribute and the entity that defined this information might be associated with a "by" attribute.

As just one example, consider the following RSS item, represented using XML, as it might exist before the operations of the exemplary operational flow 800 are performed:

```
<item>
    <title>This is a test title</title>
    <description>This is a test item description.</description>
</item>
```

After the operations of the exemplary operational flow 800 have been performed, the same item might be represented in a feed as follows:

```
<item>
    <sx:sync id="0a7903db47fb0ae8" version,"1">
        <sx:history when="Sat, 21 May 2005 09:43:33 GMT" by="UserXDeviceY"/>
    </sx:sync>
    <title>This is a test title</title>
    <description>This is a test item description.</description>
</item>
```

In some implementations, the information defined by the operations of the exemplary operational flow 800 might be considered to form at least part of the sync data 750 described previously with reference to FIG. 7. In the same or other implementations, the item data that existed before the execution of the exemplary operational flow 800 might be considered to form at least part of the item data 760 also described previously with reference to FIG. 7.

Figure 9:
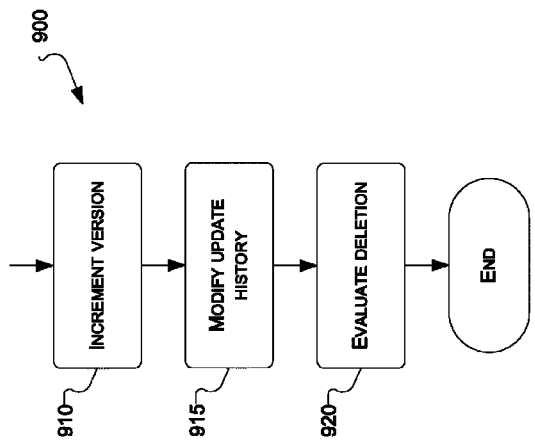
FIG. 9 illustrates an exemplary generalized operational flow including various operations that may be performed when performing a local update of an item.

Turning now to FIG. 9, shown therein is an exemplary generalized operational flow 900 including various operations that may be performed when performing a local update of an item. The following description of FIG. 9 may be made with reference to other figures. However, it should be understood that the operational flow described with reference to FIG. 9 is not intended to be limited to being used with the elements described with reference to these other figures. In addition, while the exemplary operational flow of FIG. 9 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

As before, a local update, as performed by the operations of the exemplary operational flow 900, may be defined as an update that is performed outside of a merge operation. Such a local update may include both the modification of an item—for example, this might include the modification of a contact's address or phone number in a contact item—as well as the deletion of an item.

In an exemplary implementation of operation 910 the version data associated with the item may be incremented, for example, by one. In implementations that, for example, generate a feed that is represented using XML, this operation might result in a change to the value associated with a "version" attribute. If the previous value of the version attribute was "1" a new value might be "2", and so on.

In one implementation of operation 915, the update history of the item might be modified so as to capture information about when this particular modification takes place and also, in some implementations, to maintain at least some information about previous modifications. One possible implementation of this operation might involve first creating a new "update" element, or the like, as the first member of the existing update history (in doing so, any previously existing update information might be moved down in order). Note that, as has been previously stated, while this operation, and others, may be described in some cases in the context of concepts related to XML including, for example, elements and attributes, these descriptions are in no way limiting to an implementation that only uses or results in XML data. For example, in some implementations an update history, including the information described as residing, in some implementations, in "history" and "update" elements, might be created and maintained in memory, using database records or other data structures, and the like. In some implementations, the relevant information may not be stored, persisted, or communicated as XML. Some of the descriptions provided herein use XML concepts only for ease of explanation.

To set the values of the "when" (modification time) and "by" (modifying entity) attributes of the new "update" element, operation 915 might copy the corresponding data from the current "history" element. In doing so, data about the most recent previous modification—which may have been previously recorded with "when" and "by" values in the "history" element—may now be saved in the new "update" element, and so may not be lost if the data associated with the "history" element is updated.

In some implementations, operation 915 may truncate the update history by deleting some or all of the "update" elements. In implementations that truncate the update history, the "update" elements may generally be deleted in reverse order of their creation so that older update history is deleted before newer update history.

Finally, operation 915 might set one or both of the "when" (again, modification time) and "by" (again, modifying entity) attributes of the top-level "history" element to the current time and entity making this modification, respectively.

In one implementation of operation 920, further steps may be performed in the case where the modification is a deletion of the item. When this is the case, in some implementations the "deleted" attribute of the top-level "sync" element may be set to "true". In some implementations, the data associated with the item may also be physically deleted. However, in at least some implementations the top-level "item" element as well as the "sync" element and its children might be retained. (In implementations that use the concept of partial feeds, the actual "item" and "sync" element may be physically deleted when allowed, as defined by the "window" attribute of the "sharing" element, and as described previously with reference to FIG. 7.)

As just one example, consider the following RSS item, represented using XML, as it might exist after having been modified three times in sequence, once per day, by the same endpoint:

```
<item>
    <sx:sync id="0a7903db47fb0ae8" version="4">
        <sx:history when="Tue, 24 May 2005 09:43:33 GMT" by="UserXDeviceY">
            <sx:update when="Mon, 23 May 2005 09:43:33 GMT" by="UserXDeviceY" />
            <sx:update when="Sun, 22 May 2005 09:43:33 GMT" by="UserXDeviceY" />
            <sx:update when="Sat, 21 May 2005 09:43:33 GMT" by="UserXDeviceY" />
        </sx:history>
    </sx:sync>
    <title>This is a test title</title>
    <description>This is a test item description.</description>
</item>
```

In this example, the execution of the exemplary operational flow 900 three different times has resulted in the creation of three "update" elements that represent the time at which the modification took place and the entity that made the modification.

If this particular RSS item is modified again two more times, once per day, and the particular implementation only maintains the most recent three versions, the resulting item might look as follows, represented as XML:

```
<item>
    <sx:sync id="0a7903db47fb0ae8" version="6">
        <sx:history when="Thu, 26 May 2005 09:43:33 GMT" by="UserXDeviceY">
            <sx:update when="Wed, 25 May 2005 09:43:33 GMT" by="UserXDeviceY" />
            <sx:update when="Tue, 24 May 2005 09:43:33 GMT" by="UserXDeviceY" />
            <sx:update when="Mon, 23 May 2005 09:43:33 GMT" by="UserXDeviceY" />
        </sx:history>
    </sx:sync>
    <title>This is a test title</title>
    <description>This is a test item description.</description>
</item>
```

Turning now to FIG. 10, shown therein is an exemplary generalized operational flow 1000 that includes various operations that might be performed when merging changes made by another endpoint with the data maintained by a local implementation of an endpoint. The following description of FIG. 10 may be made with reference to other figures. However, it should be understood that the operational flow described with reference to FIG. 10 is not intended to be limited to being used with the elements described with reference to these other figures. In addition, while the exemplary operational flow of FIG. 10 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 1010, a foreign feed that contains information about the items synchronized between two endpoints may be accessed. In some embodiments, a foreign feed may be made up of items that each may contain item data and sync data, for example, perhaps as further described previously with reference to FIG. 7. In some implementations, the foreign feed may be the feed exported or provided by the other endpoint that is part of a sharing relationship with the endpoint that is performing the merge.

In some implementations, a foreign feed may be provided in some fashion by another endpoint. For example, the operation of accessing the foreign feed may in some implementations involve using a network to physically retrieve a file or files that contain the foreign feed. Because the mechanism by which the foreign feed is accessed or transmitted may be irrelevant to the operation of the steps illustrated with reference to FIG. 10, this step may also encompass any other means by which a foreign feed may be accessed, including manual transfer of data using some other form of storage including a CD, a flash drive, a physical printout of data on paper, and so on. A particular foreign feed may not necessarily contain all of the items synchronized by a particular endpoint—for example, an endpoint may synchronize with multiple foreign feeds, each which may contain the same or a different set of items.

It should be noted that while some of the preceding and following description may refer to the foreign feed as, for example, an XML document that contains item and sharing information perhaps like that described elsewhere in this specification, the foreign feed is not so limited. For example, the foreign feed may not necessarily always be provided as an XML document. Any feed provided by another endpoint that contains item and sharing information may possibly be accessed or used as described in this operation and the operational flow 1000.

In at least one implementation of operation 1015, it may be determined if the foreign feed contains any foreign items that have not yet been processed. In this context, the term "foreign item" may refer to an item defined by the foreign feed, in contrast to a "local item," which may refer to an item stored or managed by the entity that accesses the foreign feed, including, in some implementations, the entity or entities that execute the operational flow 1000. If there are no remaining foreign items to process, the operational flow ends. If the foreign feed contains at least one item that has not yet been processed, the exemplary operational flow proceeds to operation 1020.

In an exemplary implementation of operation 1020, the next foreign item is retrieved from or identified using the foreign feed. For example, if the foreign feed is associated with five foreign items, the first time operation 1020 is executed, one of these items may be retrieved. The next time operation 1020 is executed, another of these items may be retrieved, and so on. This may continue until all foreign items have been retrieved, at which point operation 1015 stops any further retrieval.

In at least one implementation of operation 1025, it is determined if the current foreign item—that is, the foreign item retrieved in the most recent execution of operation 1020—is a new item that the endpoint performing the exemplary operational flow 1000 has not yet evaluated. In some implementations, this operation may be performed by determining if a data store that contains local items and is managed or accessible from the local endpoint contains an item that has the same unique identifier as the current foreign item. If no such local item exists, the foreign item may be determined to be new, and the operational flow may proceed to operation 1030. If the local data store contains an item with the same unique identifier as the foreign item, the foreign item may not be considered new, and the operational flow may proceed to operation 1035.

If the foreign item is new, the operational flow may proceed to operation 1030 where, in an exemplary implementation, data from the foreign item may be used to create a corresponding local item. The implementation of this operation may vary according to different factors including how, for example, local items are stored. In some implementations, this operation may be performed by creating a new database record or records, a new data structure or data structures, and so on, and setting the rows, fields, or the like by copying information from the foreign item. In other implementations, this operation may be performed by copying the information from the foreign item into a feed document maintained locally, and so on.

If the foreign item is not new, the operational flow may proceed to operation 1035 where, in at least some implementations, data from the foreign item is used to evaluate if and how the corresponding local item should be updated. For example, data from the foreign item may be determined to be more recent than data from the local item, and so may in some cases overwrite the corresponding data in the local item. A number of other operations may occur as part of the evaluate local item update operation. An exemplary implementation of these other operations is described in more detail below, with reference to FIG. 11. It should be noted that, in at least some implementations, data that is overwritten may need to be saved, at least until the remaining operations that relate to this foreign item are performed. For example, an operation related to processing conflicts may use some of the data that might be overwritten as part of operation 1035.

In an exemplary implementation of operation 1040, it may be determined if it is necessary to process conflicts associated with the foreign item and the local item. If no conflict processing is needed, the operational flow may proceed to operation 1015. If conflict processing is required, the operational flow may proceed to operation 1045. This determination may be made in a variety of ways, including by, for example, determining if the foreign item, the local item, or both items contain a flag or some other data that indicates if conflicts should be or should not be processed. In some implementations, such a flag might be the "noconflicts" attribute described previously, for example with reference to FIG. 7. In these implementations, if the "noconflicts" attribute exists and is set to "true", no conflict processing may be necessary.

If conflict processing is indicated, the operational flow may proceed to operation 1045, where, in an exemplary implementation, potential conflicts between the foreign item and the local item may be processed. The steps executed during conflict processing may vary in different implementations and may include one or both of a conflict detection operation and a conflict preservation option. One implementation of conflict processing operations, such as these, is described in more detail below, with reference to FIG. 12.

Figure 11:
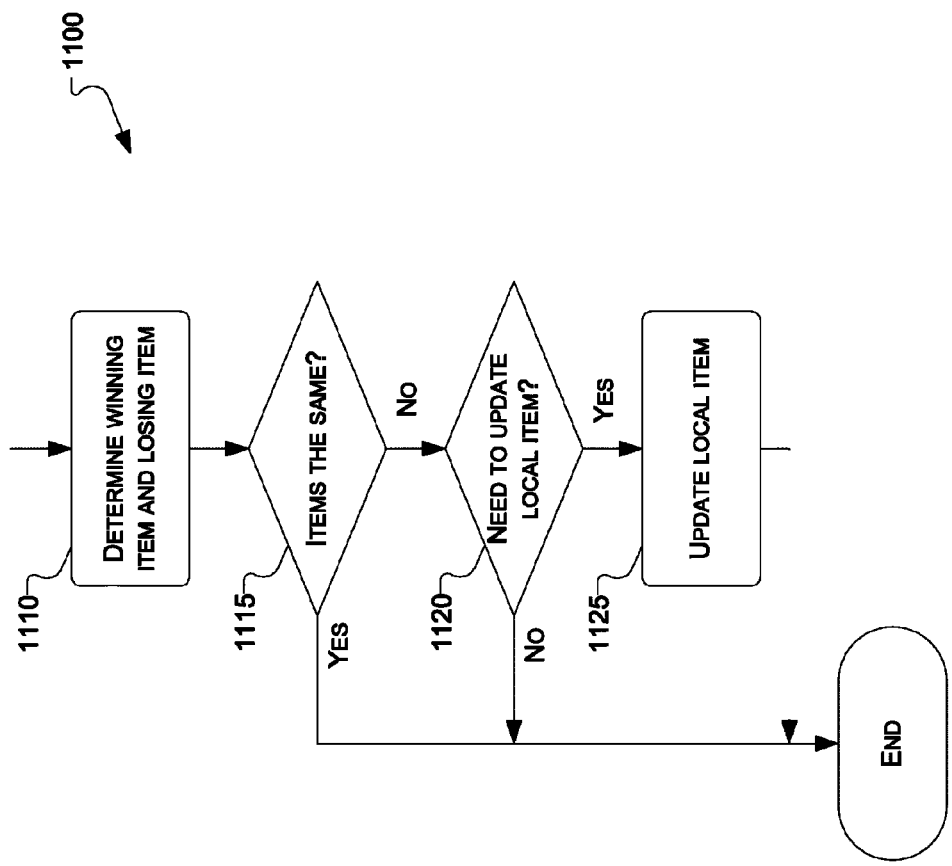
FIG. 11 illustrates an exemplary generalized operational flow that includes operations that might be performed as part of evaluating how a local item might be updated during a merge operation.

Turning now to FIG. 11, shown therein is an exemplary generalized operational flow 1100 that includes operations that might be performed as part of evaluating how a local item might be updated during a merge operation. In some implementations, the steps described in FIG. 11 may be used as all or part of an implementation of operation 1035 described previously with reference to FIG. 10. This description of FIG. 11 may be made with reference to other figures. However, it should be understood that the operational flow described with reference to FIG. 11 is not intended to be limited to being used with the elements described with reference to these other figures. In addition, while the exemplary operational flow of FIG. 11 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 1110, a "winning item" and "losing item" may be determined from two items presented. For example, when the operations in the operational flow 1100 are used in the context of the merge operational flow 1000 described previously with reference to FIG. 10, the two items presented may comprise the foreign item and the local item identified as part of the merge operational flow 1000. One of these items may be selected to be the winning item, which in some implementations is the item that is determined to have precedence, for some reason or reasons, and the other item may be selected to be the losing item. Furthermore, in some cases neither item may be determined to be the winning item or the losing item.

In some implementations, the determination of the winning item and the losing item may be made by comparing data associated with both items. For example, the winning item and losing item may be determined by a comparison of the current version of the items, the most recent time the items were modified, and the entities that performed the most recent item modification. In the case where the items are similar to those described previously with reference to FIG. 7, this data may be determined, for example, using the "version" attribute of the "sync" element, the "when" attribute of the "history" element, and "by" attribute of the "history" element, respectively. In such an implementation, the version data may be compared first, and an item with a greater version number may be determined to be the winning item. If both items have the same version, the most recent modification time may be compared, and the item with the more recent modification time may be determined to be the winning item. If both modifications were performed at the same time (for example, within the same second), then the entities that performed the modifications may be compared, and the item that has the entity with the "greater" value—as determined by text comparison, for example—may be determined to be the winning item. In implementations where the modification time and modifying entity are not necessarily required to be defined for each item, a comparison may determine that a winning item is the item that has data for a particular field—for example, if only one of the items has a modification time defined, that item may be determined to be the winner in a comparison of modification times.

If one item is determined to be the winning item, the other item may be determined to be the losing item. If neither item is determined to be the winning item, then neither item may be determined to be the winning item or the losing item.

In an exemplary implementation of operation 1115, it is determined if the items are considered the "same" for the purposes of updating the local item. In one implementation, this operation may use the results of the previous operation 1110. If neither item was identified as the winning item in operation 1110, then the items may be considered to be the same, and the operational flow 1100 may end. If operation 1110 determined a winning item and a losing item, then the items may be determined to not be the same, and the operational flow 1100 may proceed to operation 1120. Note that in some implementations, the determination of whether the items are the same may use only the synchronization data associated with each item—like the version, modification time, and modifying entity—as described above, for example. In these or other implementations, the determination of whether the items are the same may not use item data, like contact information when the item represents a contact, image information when the item represents an image, and so on. This may mean that the item data associated with each of the two items is different even when the items are determined to be the same in this operation, and vice versa.

In at least one implementation of operation 1120, it may be determined whether the local item needs to be updated. For example, when the operational flow 1100 exists in the context of some other set of operations that provide a foreign item and a local item, like when the operational flow is executed as part of the merge operational flow 1000, this operation may determine if the local item should be updated. In some implementations, it may be determined that the local item should be updated if the foreign item was determined to be the winning item. For example, this might be the case if the foreign item had a greater version number than the local item or had a more recent modification time than the local item. If the local item needs to be updated, the operational flow 1100 proceeds to operation 1125; otherwise, the operational flow ends.

In an exemplary implementation of operation 1125, the local item may be updated. The implementation of this operation may vary according to how, for example, local items are stored. In some implementations, this operation may be performed by modifying a database record or records, a data structure or data structures, and so on, that may store data about the local items, by copying data from the foreign item. In other implementations, this operation may be performed by copying information from the foreign item into a feed document maintained locally, and so on. In at least some cases, both the synchronization data and the item data may be copied and used to update the local item. This means that, as a result, the local item now may have the same item data, same update history, same version, and so on, as the foreign item.

Turning now to FIG. 12, shown therein is an exemplary generalized operational flow 1200 that includes operations that might be performed when processing conflicts. In some implementations, the steps described in FIG. 12 may be used as all or part of an implementation of operation 1045 described previously with reference to FIG. 10. This description of FIG. 12 may be made with reference to other figures. However, it should be understood that the operational flow described with reference to FIG. 12 is not intended to be limited to being used with the elements described with reference to these other figures. In addition, while the exemplary operational flow of FIG. 12 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 1210, it may be determined whether the two presented items are in conflict. In this context, the operational flow 1200 may be assumed to be operating with two items. Such items may be a winning item and losing item, as identified, for example, by the operations of operational flow 700 described previously with reference to FIG. 7. Such items may also be a foreign item and a local item, as described previously, for example, with reference to FIG. 10. In addition, as used herein, the term "in conflict" may refer to the case where separate modifications were made independently to the same item. For example, suppose the same item is modified by two different endpoints, and neither endpoint knows of the other endpoint's modification at the time the endpoint is making its own modification. Such items might be determined to be in conflict, for example, during a merge operation. When this definition of the term "in conflict" is used, it may be possible for items that have the same item data—for example, for a contact that has the same name, address, phone number(s), and so on—to still be determined to be in conflict. This might occur, in one example, if two endpoints independently modified, say, a phone number field of a contact to the same new phone number. In some implementations, additional processing—not described herein—may be used to determine if items like this are truly different.

One procedure for determining if the two items are in conflict in operation 1210 uses information about when and by whom modifications were made. For example, in an implementation that uses data described previously, for example, with reference to FIG. 7, or uses similar data, conflicts may be detected by first identifying the value of the "version" attribute of the "sync" element of the winning item, and defining this value as n. This value may then be decremented by the value of the "version" attribute of the "sync" element of the losing item, and the resulting value stored as an updated n. Then, the values of the "when" (modification time) and "by" (modifying entity) attributes of the losing item's "history" element may be compared with the values of the "when" and "by" attributes of the winning item's "update" element that corresponds to the value of n. If n is zero, then the values of the "when" and "by" attributes of the losing item's "history" element may be compared with the values of the "when" and "by" attributes of the winning item's "history" element.

If the identified "when" and "by" values are the same, or if the "update" element corresponding to n does not exist (when n is greater than zero), the items may be determined to not be in conflict. If the at least one of the "when" and "by" values are not the same, the items may be determined to be in conflict.

As one example of how this implementation of conflict detection might proceed, suppose one endpoint—perhaps called endpoint A—modified an item so the item's representation in a feed was:

```
<item>
    <sx:sync id="0a7903db47fb0ae8" version="3" deleted="false">
        <sx:history when="Thu, 6 Jul 2006 20:27:22 GMT" by="endpointA">
            <sx:update when="Thu, 6 Jul 2006 20:27:21 GMT" by="endpointA" />
            <sx:update when="Thu, 6 Jul 2006 20:27:20 GMT" by="endpointA" />
        </sx:history>
    </sx:sync>
    <title>This is a test title, modified by endpoint A</title>
    <description>This is a test item description.</description>
</item>
```

And suppose another endpoint—perhaps called endpoint B—modified an item so the item's representation in a feed was:

```
<item>
    <sx:sync id="0a7903db47fb0ae8" version="3" deleted="false">
        <sx:history when="Thu, 6 Jul 2006 20:27:23 GMT" by="endpointB">
            <sx:update when="Thu, 6 Jul 2006 20:27:21 GMT" by="endpointA" />
            <sx:update when="Thu, 6 Jul 2006 20:27:20 GMT" by="endpointA" />
        </sx:history>
    </sx:sync>
    <title>This is a test title, modified by endpoint B</title>
    <description>This is a test item description.</description>
</item>
```

As is evident when examining the "history" elements of both items, the "when" attribute of the "history" element associated with the item modified by endpoint B shows a modification time that is one second later than the modification time associated with the change made by endpoint A. Using the previously described operations and procedures, in some implementations the item modified by endpoint B would be determined to be the winning item, and the items would be determined to be in conflict. In terms of the conflict detection procedure, the value of n would be determined to be zero, because subtracting the value of the "version" attribute associated with the losing item ("3") from the value of the "version" attribute associated with the winning item ("3") results in the value of zero. Therefore, the values of the "when" and "by" attributes of the "history" elements associated with both items would be compared, and it would be seen that the values of the "when" attributes were different, therefore indicating that the items were in conflict.

In an exemplary implementation of operation 1215, some or all conflict data associated with both items in question may be preserved. In this context, "preserving conflict information" may refer to the preservation of item and synchronization data associated with conflicts. For example, suppose that two items were modified independently and were subsequently determined to be in conflict. Also suppose that the data associated with the winning item was to be used, or was already used, to overwrite the data associated with the losing item. As part of conflict preservation, in some implementations the data associated with the losing item may be preserved. This may lessen or eliminate data loss, and enable, for example, subsequent user intervention to determine if the "correct" data (as defined by a user, for example) was retained.

One procedure for preserving conflicts might use a "conflict collection" and a "resolved conflict collection." In implementations that use feeds that have XML representations, these collections might be implemented as, for example, elements named "conflicts" and "resolvedconflicts". The children of the "conflicts" and "resolvedconflicts" elements may in turn be, for example, one or more instances of "item" elements that existed at some time in losing items. When an "item" element is a member of a conflict collection or a resolved conflict collection, it may be referred to as a "conflict item", "conflict element", "resolved conflict item", or a "resolved conflict element". (Resolved conflicts are described in more detail below, with reference to FIG. 13.)

For example, in the previous exemplary description with reference to operation 1210, the item modified by endpoint A was determined to be the losing item. As a result of a conflict preservation operation like operation 1215, the data associated with the modification made by endpoint A might be preserved as part of the winning item, and may, for example, appear like the following in an XML representation of the feed:

```
<item>
    <sx:sync id="0a7903db47fb0ae8" version="3" deleted="false">
        <sx:history when="Thu, 6 Jul 2006 20:27:23 GMT" by="endpointB">
            <sx:update when="Thu, 6 Jul 2006 20:27:21 GMT" by="endpointA" />
            <sx:update when="Thu, 6 Jul 2006 20:27:20 GMT" by="endpointA" />
        </sx:history>
        <sx:conflicts>
            <item>
                <sx:sync id="0a7903db47fb0ae8" version="3" deleted="false">
                    <sx:history when="Thu, 6 Jul 2006 20:27:22 GMT" by="endpointA">
                        <sx:update when="Thu, 6 Jul 2006 20:27:21 GMT" by="endpointA" />
                        <sx:update when="Thu, 6 Jul 2006 20:27:20 GMT" by="endpointA" />
                    </sx:history>
                </sx:sync>
```

```
        <title>This is a test title, modified by endpoint A</title>
        <description>This is a test item description.</description>
      </item>
    </sx:conflicts>
  </sx:sync>
  <title>This is a test title, modified by endpoint B</title>
  <description>This is a test item description.</description>
</item>
```

In one implementation of a conflict preservation procedure, if a losing item's conflict collection is not empty, any items in a losing item's conflict collection may be copied to the winning item's conflict collection. In this context, the term "identical" may mean that the items have the same values associated with the version, modification time, and modifying entity (i.e., they might have the same values for the "version", "when", and "by" attributes). If the winning item already has an identical item in its conflict collection, that particular item may not be copied. Similarly, if a losing item's resolved conflict collection is not empty, any items in the losing item's resolved conflict collection may be copied to the winning item's resolved conflict collection, unless the winning item already has an identical item in its resolved conflict collection. Then, any identical items that exist in both the winning item's conflict collection and the winning item's resolved conflict collection may be removed from the winning item's conflict collection.

Finally, in the case where the items were found to be in conflict—for example, they may have been found to be in conflict during operation 1210—the losing item may be preserved as part of the winning item's data. In at least some implementations, this might be implemented by deleting the losing item's conflict and resolved conflict collections (perhaps by removing the losing item's "conflicts" and "resolved-conflicts" elements), and by then appending the losing item to the winning item's conflict collection, perhaps by appending the losing item's "item" element to the winning item's "conflicts" element. The previously presented example XML showing a "conflicts" element demonstrates one exemplary manner in which this might be done for the described example.

Turning now to FIG. 13, shown therein is an exemplary generalized operational flow 1300 that includes operations that might be performed as part of resolving conflicts. This description of FIG. 13 may be made with reference to other figures. However, it should be understood that the operational flow described with reference to FIG. 13 is not intended to be limited to being used with the elements described with reference to these other figures. In addition, while the exemplary operational flow of FIG. 13 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

Some implementations may provide the ability to "resolve a conflict," where such resolution may refer to the modification of an item after one or more conflicts associated with that item have been identified. In at least some cases, the resolution of conflicts may be performed by a user or some other entity outside of the context of the synchronization operations. For example, a user may examine the data identified by a merge procedure as the "winning" and "losing" data, and validate that the data chosen as the winning data was correct, that the losing data should have been chosen, or that some other data—perhaps in some cases a manual combination of pieces of data, for example—should instead be used.

In an exemplary implementation of operation 1310, an item may be updated with the appropriate data. In this context, the appropriate data may be selected from one of the following: the most recent item data (i.e., this might be the case if winning item identified in a merge procedure had the correct data); the data associated with one of the members of the item's conflict collection; and from some other source, including completely new data, some user-performed manual combination of existing and/or new data, and so on. In some implementations, such an update may need to be performed using the same procedures as other updates. For example, in implementations that use the modification operations previously described with reference to FIG. 9, the item's version may be incremented, the update history may be modified, and so on.

In at least one implementation of operation 1315, conflict data may be updated after the item itself is updated in operation 1310. As part of this operation, a resolved conflict collection may be created for the item, if one does not already exist. In cases where a feed is represented using XML, this may at some point result in the creation of a "resolvedconflicts" element. Then, any members of the item's conflict collection that are deemed to no longer be relevant or valid may be moved from the conflict collection to the resolved conflict collection. In cases where a feed is represented using XML, this may at some point result in moving items that are children of the "conflicts" element to be children of the "resolvedconflicts" element. In this context, whether a member of the conflict collection is no longer relevant or valid may be determined by the user or entity resolving the conflict. In some cases this may result in all of the members of the conflict collection being moved to the resolved conflict collection, while in other cases only some, or none, of the members of the conflict collection may be moved to the resolved conflict collection. For example, if a member of the conflict collection exists that is not addressed by the data used during the update item operation 1310, that member may remain in the conflict collection. After any items have been moved to the resolved conflict collection, if the conflict collection contains no remaining items, the conflict collection itself may be deleted which, in XML feed representations, may result in the removal of the "conflicts" element.

As just one example, using the example XML representation described previously with reference to operational flow 1200 and FIG. 12, after one possible conflict resolution procedure, an item might have the following representation:

```
<item>
   <sx:sync id="0a7903db47fb0ae8" version="4" deleted="false">
      <sx:history when="Fri, 7 Jul 2006 20:27:24 GMT" by="endpointB">
         <sx:update when="Thu, 6 Jul 2006 20:27:23 GMT" by="endpointB">
         <sx:update when="Thu, 6 Jul 2006 20:27:21 GMT" by="endpointA" />
         <sx:update when="Thu, 6 Jul 2006 20:27:20 GMT" by="endpointA" />
      </sx:history>
      <sx:resolvedconflicts>
         <item>
            <sx:sync id="0a7903db47fb0ae8" version="3" deleted="false">
               <sx:history when="Thu, 6 Jul 2006 20:27:22 GMT" by="endpointA">
                  <sx:update when="Thu, 6 Jul 2006 20:27:21 GMT" by="endpointA" />
                  <sx:update when="Thu, 6 Jul 2006 20:27:20 GMT" by="endpointA" />
               </sx:history>
            </sx:sync>
            <title>This is a test title, modified by endpoint A</title>
            <description>This is a test item description.</description>
         </item>
      </sx:resolvedconflicts>
   </sx:sync>
   <title>This is a resolved test title </title>
   <description>This is a test item description.</description>
</item>
```

In this example, the "title" element has been modified to contain new data, the version and update history of the item have been updated as part of the modification, the "item" element that was previously part of the conflict collection has been moved to the resolved conflict collection, and the conflict collection has been removed because it no longer contained any items.

Example Computing Environment

Figure 14:
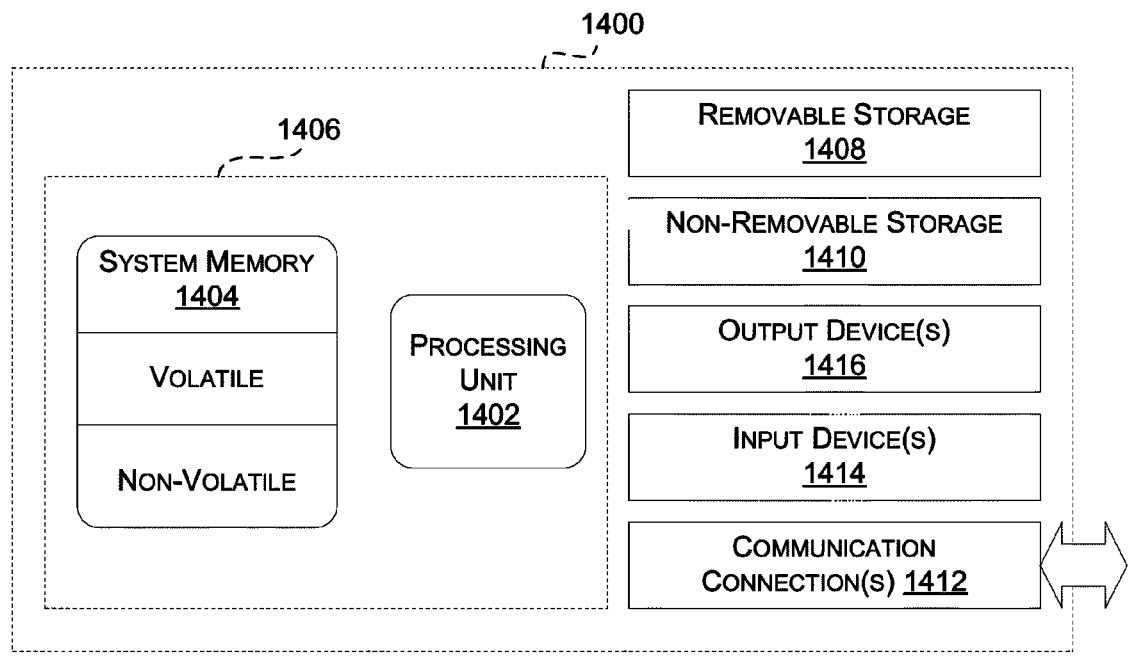
FIG. 14 illustrates an exemplary computer device in which the various technologies described herein may be implemented.

Turning now to FIG. 14, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1400 illustrated in FIG. 14.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 1400 illustrated in FIG. 14, in its most basic configuration, includes at least one processing unit 1402 and memory 1404. In some implementations, the computing device 1400 may implement all or part of, for example, the computer system 210, described previously with reference to FIG. 2. In some implementations, the processing unit 1402 may be a general purpose central processing unit (CPU), as exists, for example, on a variety of computers, including desktop and laptop computers. Depending on the exact configuration and type of computing device, the memory 1404 may be volatile (such as RAM), non-volatile (such as ROM, flash memory, etc.), or some combination of the two. This most basic configuration is illustrated in FIG. 14 by dashed line 1406. Additionally, the computing device 1400 may also have additional features and functionality. For example, the computing device 1400 may also include additional storage (removable and/or non-removable) including, but not limited to, magnetic or optical disks or tape. Such additional storage is illustrated in FIG. 14 by the removable storage 1408 and the non-removable storage 1410.

The computing device 1400 may also contain one or more communications connection(s) 1412 that allow the computing device 1400 to communicate with other devices and services. For example, the computing device might have one or more connections to other computing devices, including, for example, the endpoints described previously with reference to FIG. 1. The computing device 1400 may also have one or more input device(s) 1414 such as an image input devices like cameras or scanners, keyboards, mice, pens, voice input devices including microphone arrays, touch input devices, and so on. One or more output device(s) 1416 such as a display, speakers, printer, and so on, may also be included in the computing device 1400.

Those skilled in the art will appreciate that the technologies described herein may be practiced with computing devices other than the computing device 1400 illustrated in FIG. 14. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 14, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method implemented by one or more processing devices, the method comprising:
identifying a conflict between a first endpoint and a second endpoint that are in a sharing relationship, the sharing relationship comprising sharing a feed, wherein relationship metadata associated with the sharing relationship is shared as a file in the feed, the relationship metadata including a category identifying multiple types of data, the identifying the conflict comprising:
determining a first change to a first instance of an item by the first endpoint, and
determining a second change to a second instance of the item by the second endpoint before the second endpoint received an indication of the first change; and
notifying at least one of the first endpoint or the second endpoint of the conflict via an email message comprising an indication of at least one of the first change or the second change.

2. The method of claim 1, wherein the first endpoint is a publishing endpoint of the feed and the second endpoint is a subscribing endpoint to the feed, the feed comprising Simple Sharing Extensions.

3. The method of claim 1, wherein the email message includes indications of both the first change and the second change.

4. The method of claim 1, wherein the identifying is performed in response to a specified number of changes to the item.

5. The method of claim 1, further comprising:
receiving another indication that the conflict has been resolved; and
marking the conflict as resolved in the feed.

6. The method of claim 1, wherein the first change and the second change are identical updates of the item.

7. The method of claim 1, wherein the multiple types of data include contacts and calendar items.

8. A system comprising:
one or more processing devices; and
a storage device storing computer-executable instructions which, when executed by the one or more processing devices, cause the one or more processing devices to:
identify a conflict between a first feed from a first endpoint and a second feed from a second endpoint, the first endpoint and the second endpoint being in a sharing relationship, the conflict being identified by:
identifying a first change to a first instance of an item by the first endpoint in the first feed, and
identifying a second change to a second instance of the item by the second endpoint in the second feed, wherein the second endpoint has not received an indication of the first change when the second change is made;
create a message about the conflict and store the message in a conflict notification record that is used during conflict resolution;
identify that the conflict associated with the conflict notification record has been resolved; and
mark the conflict in at least one of the first feed or the second feed as having been resolved.

9. The system of claim 8, wherein the computer-executable instructions further cause the one or more processing devices to:
determine whether the first instance and the second instance of the item are different.

10. The system of claim 9, wherein the computer-executable instructions further cause the one or more processing devices to:
in a circumstance where the first instance and the second instance are determined to be different, identify a winning instance and a losing instance.

11. The system of claim 8, the conflict notification record including a copy of at least one of the first instance or the second instance.

12. The system of claim 8, the conflict notification record comprising an email message including a copy of at least one of the first instance or the second instance.

13. The system of claim 12, wherein, to identify that the conflict has been resolved, the computer-executable instructions further cause the one or more processing devices to identify that the first instance has priority with respect to the conflict, and the email message includes data from the second instance.

14. The system of claim 8, wherein the computer-executable instructions further cause the one or more processing devices to preserve conflict data associated with the first instance or the second instance.

15. A computer readable memory device or storage device storing computer readable instructions that, when executed by one or more processing devices, cause the one or more processing devices to perform acts comprising:
identifying a conflict between a first instance of an item and a second instance of the item, wherein:
the first instance includes a first change to the item by a first endpoint, and
the second instance includes a second change to the item by a second endpoint before the second endpoint received an indication of the first change, the first endpoint and the second endpoint being in a sharing relationship;
in response to the identifying the conflict, adding a first conflict element to a first conflict collection of the first instance and a second conflict element to a second conflict collection of the second instance;
notifying at least one of the first endpoint or the second endpoint of the conflict;
identifying the first instance as a winning instance and the second instance as a losing instance; and
preserving conflict data of the second conflict element associated with the losing instance.

16. The computer readable memory device or storage device of claim 15, the notifying performed via an email message that contains a copy of at least one of the first instance or the second instance.

17. The computer readable memory device or storage device of claim 15, the preserving comprising adding data from the losing instance to the winning instance.

18. The computer readable memory device or storage device of claim 15, the preserving comprising:
  deleting the second conflict collection of the losing instance, and
  appending the losing instance to the first conflict collection of the winning instance.

19. The computer readable memory device or storage device of claim 15, the acts further comprising:
  identifying that the conflict has been resolved, and
  adding a resolved conflict element to a resolved conflict collection of the winning instance.

20. The computer readable memory device or storage device of claim 19, the acts further comprising:
  in an instance where the first conflict element of the winning instance has been addressed, moving the first conflict element from the first conflict collection to the resolved conflict collection, and
  where no conflict elements remain in the first conflict collection, deleting the first conflict collection.

* * * * *